(12) United States Patent
Yambal et al.

(10) Patent No.: US 8,473,458 B2
(45) Date of Patent: Jun. 25, 2013

(54) DOCUMENT MIGRATION

(75) Inventors: Sachin Yambal, Bangalore (IN); Muhammad Saad Nihal, Plano, TX (US); Jitendra J. Jain, Pune (IN); Vijay H. Gurdasani, Pune (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/182,075

(22) Filed: Jul. 13, 2011

(65) Prior Publication Data

US 2012/0030247 A1 Feb. 2, 2012

(51) Int. Cl.
*G06F 17/30* (2006.01)
(52) U.S. Cl.
USPC .......... 707/627; 707/618; 707/628; 707/643; 707/802
(58) Field of Classification Search
USPC ............. 707/1, 200, 802, 618, 627, 628, 643, 707/661, 684, 806, 809, 812
See application file for complete search history.

(56) References Cited

U.S. PATENT DOCUMENTS

| | | | | |
|---|---|---|---|---|
| 6,035,307 A * | 3/2000 | Martin et al. | ......... | 707/999.006 |
| 7,831,622 B2 * | 11/2010 | Prahlad et al. | ................ | 707/791 |
| 7,853,553 B2 * | 12/2010 | Lankinen et al. | ............. | 707/602 |
| 8,117,244 B2 * | 2/2012 | Marinov et al. | ................ | 707/827 |
| 8,200,700 B2 * | 6/2012 | Moore et al. | .................. | 707/791 |
| 2003/0177146 A1 * | 9/2003 | Zimowski | ...................... | 707/200 |
| 2011/0016163 A1 * | 1/2011 | Prahlad et al. | ................ | 707/809 |
| 2011/0213813 A1 * | 9/2011 | Leventhal et al. | ............ | 707/825 |

* cited by examiner

*Primary Examiner* — Fred I Ehichioya
*Assistant Examiner* — Dangelino Gortayo
(74) *Attorney, Agent, or Firm* — Fish & Richardson P.C.

(57) ABSTRACT

A document migration system that controls release, from a source enterprise content management system, of batches of documents and metadata and loading, to a target enterprise content management system, of batches of documents and metadata that have been released from the source enterprise content management system. The document migration system maps source metadata attributes from the released metadata to target metadata attributes and stores migration records that describe migration operations from release from the source enterprise content management system through loading to the target enterprise content management system.

20 Claims, 25 Drawing Sheets

Loading Batch Scheduling

Welcome Admin User

List of new batches for Extraction process:

| Select | Batches | Status | Last Scheduled Date/Time — 1302 |
|---|---|---|---|
| ☐ | Batch-1 | New | |
| ☐ | Batch-2 | Stop | |
| ☐ | Batch-3 | Pending | |
| ☐ | | | |
| ☐ | | | |
| ☐ | | | |

☐ Select All Batches    ☐ Select Time of All Batches

◉ Daily  ○ Weekly  ○ Specific Time

On Daily option selection

Start Date/Time: [          ]   End Date/Time: [          ] (optional)

On Weekly option selection

◉ Monday ○ Tuesday ○ Wednesday ○ Thursday ○ Friday ○ Saturday

Start Date/Time: [          ]   End Date/Time: [          ] (optional)

On Specific Time option selection

Start Date/Time: [          ]   End Date/Time: [          ] (optional)

[Save]

Error/Help Message:

---

1300

Batch Information — 1304

Batch Creation — 1306

Batch Scheduling — 1308
* Release
* Loading

Batch Management
* Running Batches
* Conflict Batches

User Preferences — 1310

Reports
* Release
* Loading
* Migration
* Based on Content Type
* Based on Metadata

FIG. 13

Batch Information

Batch Creation

Batch Scheduling
* Release
* Loading

Batch Management
* Running Batches
* Conflict Batches

User Preferences

Reports
* Release
* Loading
* Migration
* Based on Content Type
* Based on Metadata User Preferences — Welcome Admin User — 1400

1. Batch size: ▭ — 1402
2. Database server: ▭ — 1404
3. Database Type: ▭ — 1406
4. Database Name: ▭ — 1408
   Username: ▭ — 1410
   Password: ▭ — 1412
5. No. of Release Threads: ▭ — 1414
6. No. Of Loading Threads: ▭ — 1416
7. Source System:
   Username: ▭ — 1418
   Password: ▭ — 1420
   ☐ Use same username and password for target system — 1421
8. Target System:
   Username: ▭ — 1422
   Password: ▭ — 1424
9. Location of document id's text file: ▭ [Browse] — 1426

[Save] — 1428

FIG. 14

DOCUMENT MIGRATION

CROSS REFERENCE TO RELATED APPLICATIONS

The present application claims the benefit of Indian Patent Application No. 2153/CHE/2010, filed on Jul. 29, 2010, which is incorporated herein by reference in its entirety for all purposes.

FIELD

The present disclosure generally relates to document migration.

BACKGROUND

A company may use an enterprise content management system to capture, manage, store, preserve, and deliver content and documents related to the company and its processes. The company may use multiple, enterprise content management systems and may update or change enterprise content management systems as technology developments and new systems become available.

SUMMARY

In one aspect, a system for migrating documents from a source enterprise content management system to a target enterprise content management system includes a release component configured to establish a source connection with a source enterprise content management system using a source connector that interfaces with the source enterprise content management system and release, from the source enterprise content management system over the established source connection, documents and metadata that correspond to the released documents. The system also includes an electronic data storage unit configured to temporarily store the released documents and the released documents metadata and a loading component configured to access, from the electronic data storage unit, the released documents and the released documents metadata, map source metadata attributes from the released documents to target metadata attributes, establish a target connection with a target enterprise content management system using a target connector that interfaces with the target enterprise content management system, and load, over the established target connection to the target enterprise content management system, the released documents and the mapped metadata. The source metadata attributes correspond to attributes of the source enterprise content management system and the target metadata attributes correspond to attributes of the target enterprise content management system. The system further includes a batch engine configured to control the release component to release, from the source enterprise content management system, batches of documents and metadata, control the loading component to load, to the target enterprise content management system, batches of documents and metadata that have been released from the source enterprise content management system, and store migration records that describe migration operations from release from the source enterprise content management system through loading to the target enterprise content management system.

Implementations may include one or more of the following features. For example, the batch engine may be configured to define a release schedule that uses multiple release threads that operate concurrently and control, based on the defined release schedule, release of a batch of documents and metadata using the multiple release threads that operate concurrently. The batch engine also may be configured to define a loading schedule that uses multiple loading threads that operate concurrently and control, based on the defined loading schedule, loading of a batch of documents and metadata using the multiple loading threads that operate concurrently.

In some implementations, the batch engine may be configured to define a release schedule that uses multiple release threads that operate concurrently, define a loading schedule that uses multiple loading threads that operate concurrently, control, based on the defined release schedule, release of a batch of documents and metadata using the multiple release threads that operate concurrently, and control, based on the defined loading schedule, loading of the batch of documents and metadata using the multiple loading threads that operate concurrently. In these implementations, at least one of the release threads may operate concurrently with at least one of the loading threads such that a first subset of the batch of documents and metadata is being loaded to the target enterprise content management system while a second subset of the batch of documents and metadata is being released from the source enterprise content management system.

In some examples, the system may include a user interface component configured to provide a standard user interface for a migration process that offers the same user experience regardless of which of multiple, different target enterprise content management systems is involved in the migration process and regardless of which of multiple, different source enterprise content management systems is involved in the migration process. In these examples, the user interface component may be configured to display a standard configuration user interface for defining configuration of the migration process. The user interface component also may be configured to display a standard monitoring user interface for monitoring progress of the migration process. The user interface component further may be configured to display a standard reporting user interface for reporting results of the migration process.

In addition, the system may be configured to add a new source enterprise content management system for migration release, define a new source connector to interface with the new source enterprise content management system, and perform migration operations for the new source enterprise content management system using the new source connector and previously defined migration components. The system also may be configured to add a new target enterprise content management system for migration loading, define a new target connector to interface with the new target enterprise content management system, and perform migration operations for the new target enterprise content management system using the new target connector and previously defined migration components.

In some implementations, the system may be configured to handle migration of data from one or more source enterprise content management systems to one or more target enterprise content management systems and log end-to-end migration operations performed during the migration. In these implementations, the system may be configured to, based on the logged end-to-end migration operations, audit the one or more target enterprise content management systems to ensure proper migration. Further, in these implementations, the system may be configured to take corrective action in response to the audit revealing that at least some data was not properly migrated and the system may be configured to provide reporting based on results of the logging and auditing.

Also, the system may be configured to access a migration log that describes end-to-end migration operations performed during a migration process. The system may be configured to use the migration log to rollback the migration process.

In some examples, the release component may be configured to access a compressed batch of documents and metadata from a file system. In these examples, the loading component may be configured to receive the compressed batch of documents and metadata, uncompress the received batch of documents and metadata, and load the uncompressed batch of documents and metadata to the target enterprise content management system. Also, in these examples, the loading component may sit behind a firewall of a computer network operated by a company that uses the target enterprise content management system and the loading component is configured to pull the compressed batch of documents and metadata through the firewall.

In another aspect, a computer-implemented method of migrating documents from a source enterprise content management system to a target enterprise content management system includes establishing a source connection with a source enterprise content management system using a source connector that interfaces with the source enterprise content management system and releasing, from the source enterprise content management system over the established source connection, documents and metadata that correspond to the released documents. The method also includes temporarily storing, in an electronic data storage unit, the released documents and the released metadata, accessing, from the electronic data storage unit, the released documents and the released metadata, and mapping source metadata attributes from the released metadata to target metadata attributes. The source metadata attributes correspond to attributes of the source enterprise content management system and the target metadata attributes correspond to attributes of a target enterprise content management system. The method further includes establishing a target connection with a target enterprise content management system using a target connector that interfaces with the target enterprise content management system and loading, over the established target connection to the target enterprise content management system, the released documents and the mapped metadata. In addition, the method includes using a batch engine to control release, from the source enterprise content management system, of batches of documents and metadata, control loading, to the target enterprise content management system, of batches of documents and metadata that have been released from the source enterprise content management system, and store migration records that describe migration operations from release from the source enterprise content management system through loading to the target enterprise content management system.

In yet another aspect, at least one computer-readable storage medium is encoded with executable instructions that, when executed by at least one processor, cause the at least one processor to perform operations. The operations include establishing a source connection with a source enterprise content management system using a source connector that interfaces with the source enterprise content management system and releasing, from the source enterprise content management system over the established source connection, documents and metadata that correspond to the released documents. The operations also include temporarily storing, in an electronic data storage unit, the released documents and the released metadata, accessing, from the electronic data storage unit, the released documents and the released metadata, and mapping source metadata attributes from the released metadata to target metadata attributes. The source metadata attributes correspond to attributes of the source enterprise content management system and the target metadata attributes correspond to attributes of a target enterprise content management system. The operations further include establishing a target connection with a target enterprise content management system using a target connector that interfaces with the target enterprise content management system and loading, over the established target connection to the target enterprise content management system, the released documents and the mapped metadata. In addition, the operations include using a batch engine to control release, from the source enterprise content management system, of batches of documents and metadata, control loading, to the target enterprise content management system, of batches of documents and metadata that have been released from the source enterprise content management system, and store migration records that describe migration operations from release from the source enterprise content management system through loading to the target enterprise content management system.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 12-17 are diagrams of exemplary user interfaces.

Like reference numbers represent corresponding parts throughout.

DETAILED DESCRIPTION

Figure 1:
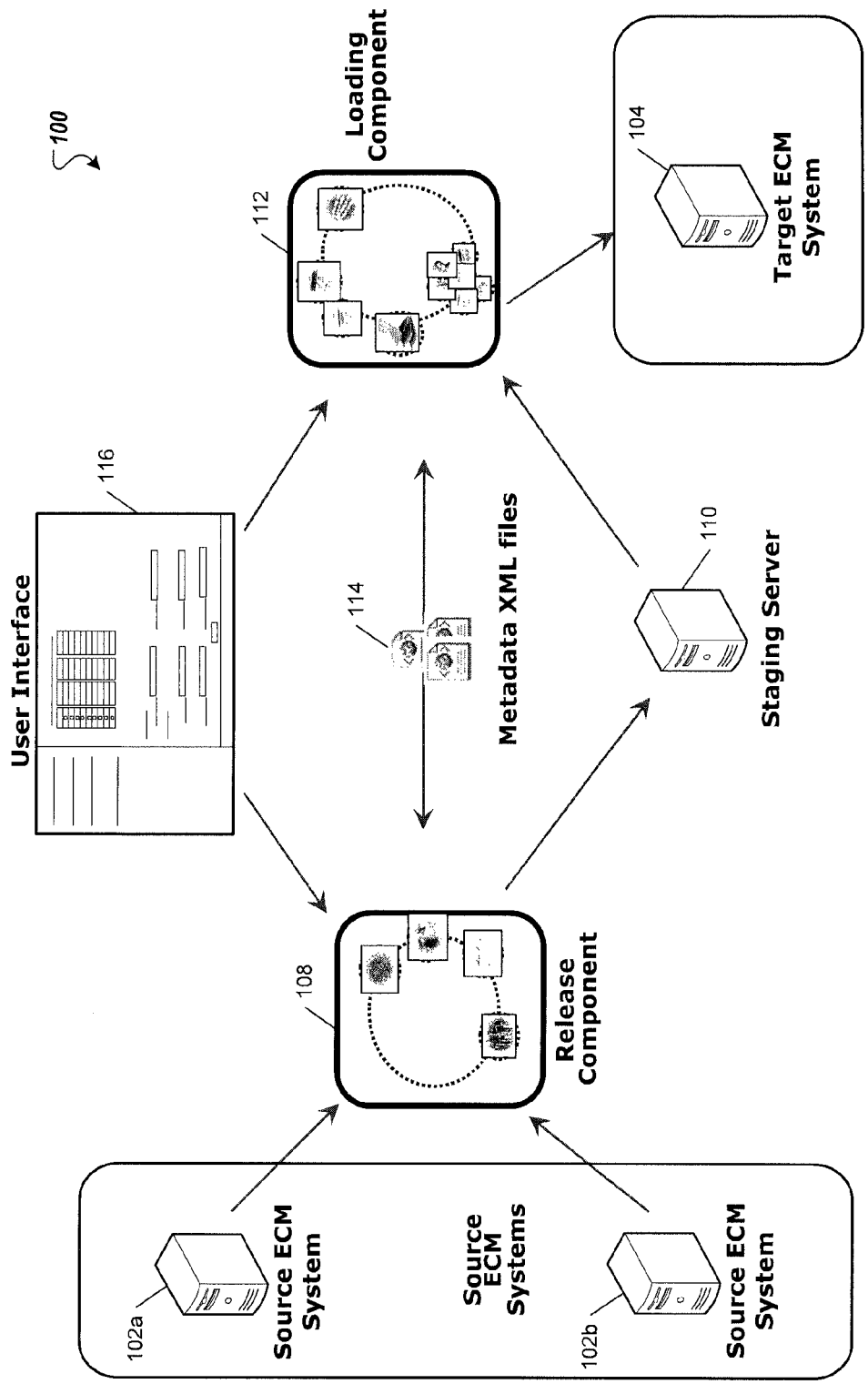
FIGS. 1, 2, 6, 18, 19, 21, 24, and 25 are diagrams of exemplary systems.

FIG. 1 illustrates a system 100 for migrating documents from a source Enterprise Content Management (ECM) system to a target ECM system. For example, the system 100 may be used to migrate documents and associated metadata from a source ECM system 102a to a target ECM system 104. The system 100 can migrate documents from multiple types of source ECM systems 102. For example, the system 100 may be used to migrate documents from a source ECM system 102b to the target ECM system 104, where the source ECM system 102b is a different type of ECM system than the source ECM system 102a. As described in more detail below, the system 100 can migrate documents to different types of target ECM systems 104.

A release component 108 is configured to establish a source connection with a source ECM system 102 using a source connector that interfaces with the source ECM system 102. The release component 108 is configured to release, from the source ECM system 102, over the established source connection, documents and metadata corresponding to the released documents. Released documents may be temporarily stored in a staging server 110. For example, documents may be temporarily stored in the file system of the staging server 110.

A loading component 112 is configured to access the released documents and corresponding metadata from the staging server 110. The loading component 112 may map source metadata attributes corresponding to attributes of the source ECM system 102 to target metadata attributes corresponding to attributes of the target ECM system 104. Metadata may be stored and/or transferred as metadata XML (eXtensible Markup Language) files 114. The loading component 112 may establish a target connection with the target ECM system 104 using a target connector that interfaces with the target ECM system 104 and may load the released documents and the mapped metadata to the target ECM system 104, over the established target connection.

A user interface component 116 may be used to provide standard user interfaces that assist a user in configuring, scheduling and monitoring migration processes. For example, the user interface component 116 may be used to configure source and target ECM system credentials, threads used by the release component 108 or the loading component 112, and mappings between source and target metadata attributes. The user interface component 116 may be used to configure migration scheduling of release and loading processes, such as to schedule batches of documents to release or load. The user interface component 116 may also be used to track and manage batch status, such as to monitor running batches, verify completed batches, or to resolve conflicts such as retrying loading of documents for which loading errors are reported. A user may be able to view various migration reports which track releasing, loading, and migration of batches.

Figure 2:
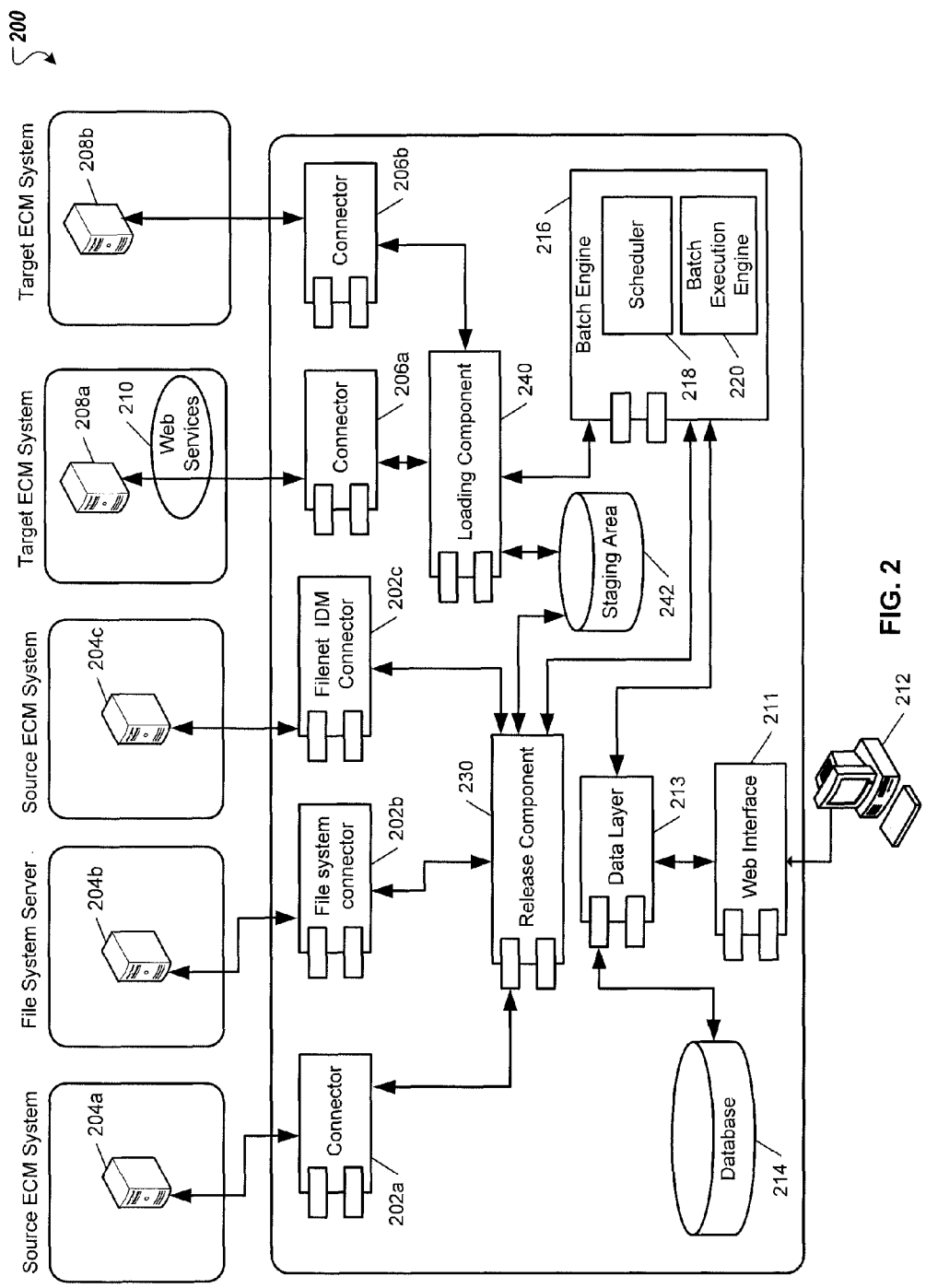

In further detail and as shown in FIG. 2, in a system 200, source connectors 202a, 202b, and 202c are configured to interface with source systems 204a, 204b, and 204c, respectively. As mentioned, multiple types of source systems 204 may be supported. For example, the source system 204c may be a Panagon ECM system and the source connector 202c may be configured to interface with the source system 204c using a Filenet IDM (Integrated Document Management) connection. As another example, the source system 204b may be a file system server which serves compressed and uncompressed files, and the source connector 202b may be a file system connector configured to connect to the file system server. The source system 204a may be yet a different type of ECM system.

Multiple types of target systems may be supported. For example, a target connector 206a may be configured to interface with a first target ECM system 208a and a target connector 206b may be configured to interface with a second target ECM system 208b. The target connector 206a may interface with the target ECM system 208a, for example, using one or more web services 210, such as DIME (Direct Internet Message Encapsulation)/MTOM (Message Transmission Optimization Mechanism) web services. The target connector 206b may connect to the target ECM system 208b using different technologies or approaches than used by the target connector 206a.

A user may configure a migration operation using a user interface component 211 that controls display of a user interface on a user device 212. For example, a user may select a source system 204 and a target system 208. A user may also identify documents to migrate from the selected source system 204 to the selected target system 208. Different approaches may be used to identify documents to migrate. For example, one or more utilities of the source system 204 may be used to generate a list of document identifiers to migrate. As another example, a query system may be used to identify documents on the source system 204 which exist in a particular location on the source system 204, are of a particular type of document, or have a creation or modification date within a particular date range.

A user may configure a migration operation to be performed using batches of documents, using a configurable batch size which corresponds to the number of documents to migrate per batch. For example, a batch size of one thousand may be selected. A user may, for example, schedule to release or to load a batch of documents at a particular time. As another example, a user may schedule a batch to release or load on a recurring basis (e.g., daily, weekly), such as where the batch is associated with documents matching criteria defined by a query.

The user interface component 211 may communicate with a data layer component 213. The data layer component 213 provides an interface for a database 214. User configurations made using the user interface component 211 may be communicated to the data layer component 213, for storage in the database 214.

A batch engine 216 is configured to release or load a batch. The batch engine 216 includes a scheduler 218 and a batch execution engine 220. The scheduler 218 is configured to check for scheduled batches. If the scheduler 218 determines that a batch is to be executed, the scheduler 218 notifies the batch execution engine 220. The scheduler 218 may load schedule information from the database 214, using the data layer 213. If a change to schedule information is made using the user interface component 211, the scheduler 218 may reload schedule information.

The batch execution engine 220 is configured to execute release or loading of scheduled batches. The batch execution engine 220 may control a release component 230 to release a batch of documents and associated metadata from a source system 204 and may control a loading component 240 to load a batch of documents and associated metadata to a target system 208. Documents may be released to and loaded from a staging area 242. The batch execution engine 220 may also communicate requests to the data layer component 213 to store migration records in the database 214, where the migration records describe migration operations. Migration records may be used, for example, for reporting, auditing, or migration rollback.

Figure 3:
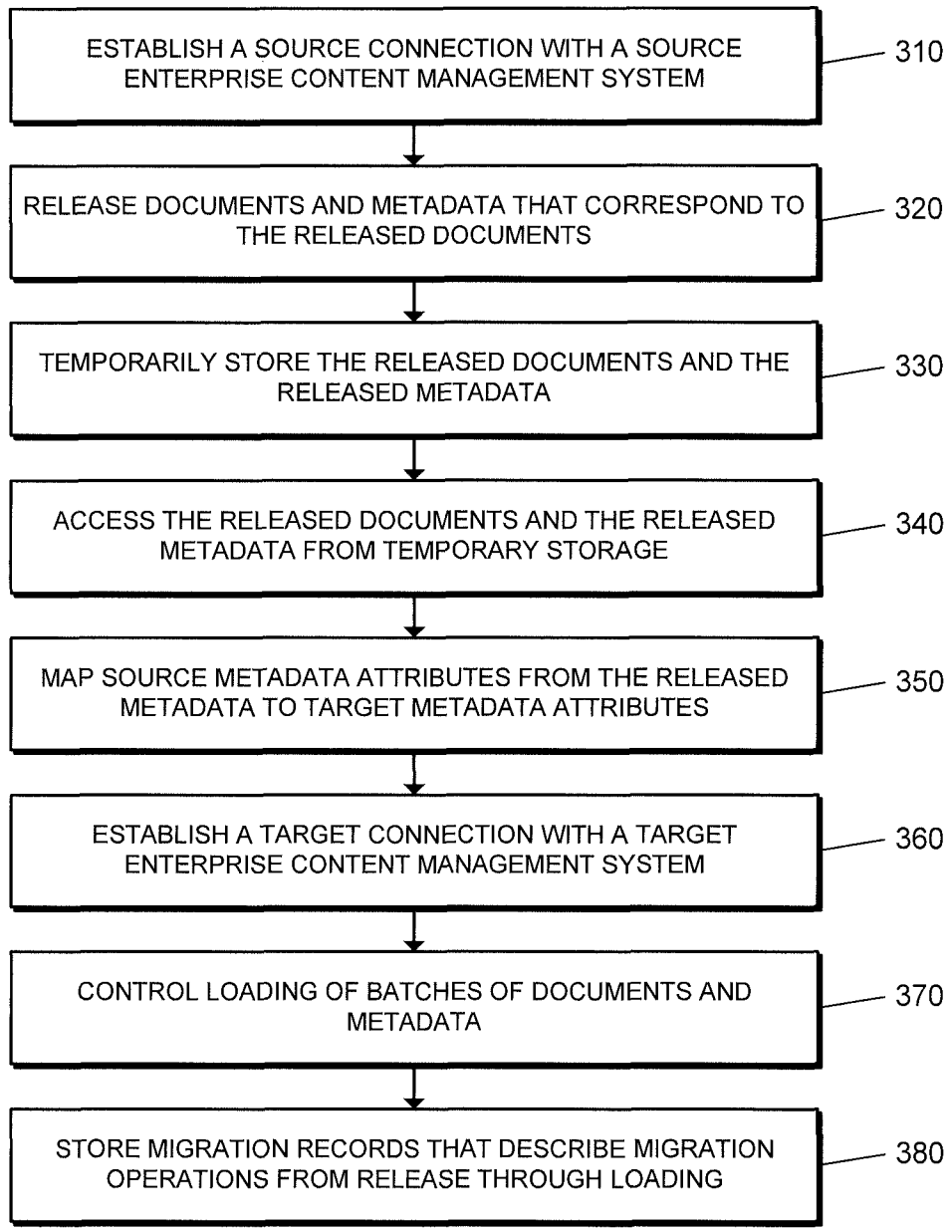
FIGS. 3, 5, 7-11, 20, 22, and 23 are flowcharts of exemplary processes.

FIG. 3 illustrates a process 300 for migrating documents from a source enterprise content management system to a target enterprise content management system. The operations of the process 300 are described generally as being performed by the system 200. The operations of the process 300 may be performed by one of the components of the system 200 (e.g., the batch engine 216) or may be performed by a combination of the components of the system 200. In some implementations, operations of the process 300 may be performed by one or more processors included in one or more electronic devices.

The system 200 establishes a source connection with a source enterprise content management system (310). For example, a source connection may be established using a source connector configured to interface with a source ECM system.

The system 200 releases documents and metadata that correspond to the released documents (320). For example, documents and metadata may be released using a release component. A release component may be executed by a new release thread created for release of a batch of documents. Other release threads may be created to simultaneously release one or more other batches of documents. Document release is described in more detail below with respect to FIG. 9.

The system 200 temporarily stores the released documents and the released metadata (330). For example, released documents and released metadata may be temporarily stored in a file system of a staging server or in a staging area.

The system 200 accesses the released documents and the released metadata from temporary storage (340). For example, a loading component may access released documents and released metadata from a file system of a staging server or from a staging area. A loading component may be executed by a new loading thread created by a batch execution engine to load a batch of documents. Other loading threads may be created to simultaneously load one or more other batches of documents.

Figure 4:
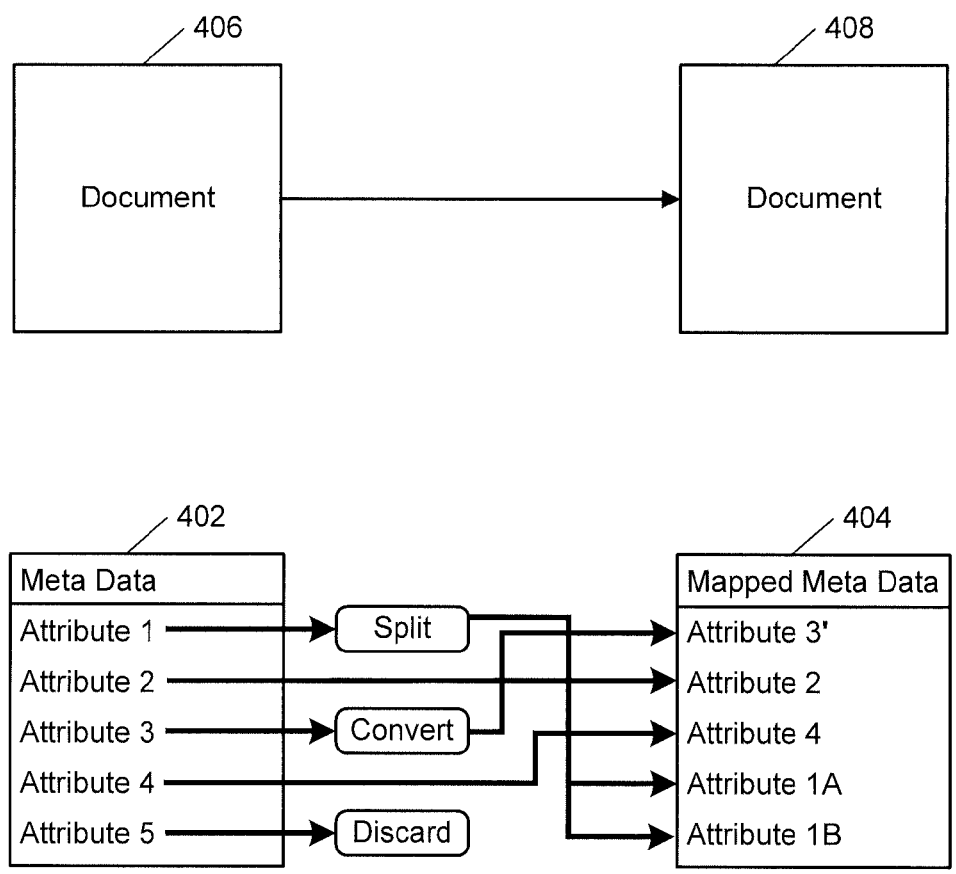
FIG. 4 is a diagram illustrating mapping of metadata attributes.

The system 200 maps source metadata attributes from the released metadata to target metadata attributes (350). For example, FIG. 4 illustrates metadata attribute mapping. Source metadata attributes 402 may be mapped to target metadata attributes 404. The source metadata attributes 402 may correspond, for example, to a source document 406 and the target metadata attributes 404 may correspond to a target document 408.

Some source metadata attributes 402 (e.g., "attribute two" and "attribute four") may be mapped unchanged to corresponding target metadata attributes 404. Some source metadata attributes 402 (e.g., "attribute five") may not be mapped to any target metadata attribute 404 and may be discarded or otherwise omitted from further processing. Some source metadata attributes 402 may be converted. For example, "attribute three" in the source metadata attributes 402 may be converted to an "attribute three prime" in the target metadata attributes 404. As another example, "attribute one" in the source metadata attributes 402 may be split into two attributes (e.g., "attribute one A" and "attribute one B") in the target metadata attributes 404. Other types of metadata mapping may be performed based on the configurations of the source and target systems.

Returning to FIG. 3, the system 200 establishes a target connection with a target enterprise content management system (360). For example, a target connection may be established using a target connector configured to interface with the target ECM system.

The system 200 controls loading of batches of documents and metadata (370). For example, a loading component executed on one or more loading threads may transfer batches of documents and metadata from a file system of the staging server to the target ECM system. Loading of documents and metadata is described in more detail below with respect to FIG. 10.

The system 200 stores migration records that describe migration operations from release through loading (380). For example, the system 200 may record the release of each document from a source ECM system in a release log and may record the loading of each document to a target ECM system in a loading log. For each release or loading operation, a document identifier, a date and time of the operation, and an indication of whether the operation succeeded may be stored. As another example, migration records may also indicate documents for which an error occurred either during release or loading.

Figure 5:
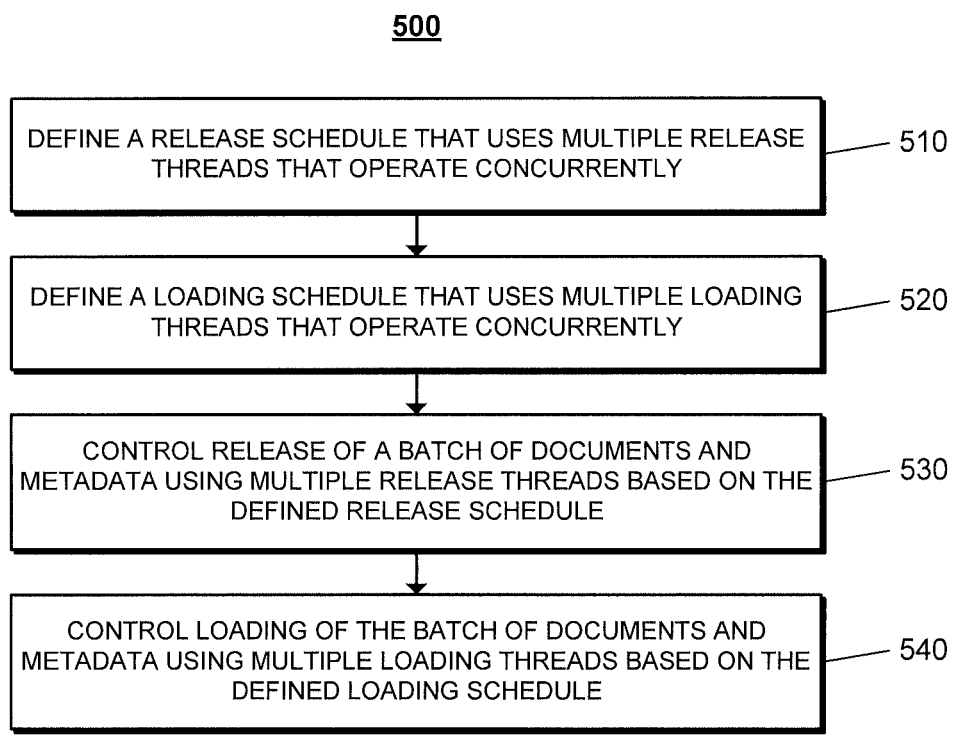

FIG. 5 illustrates a process 500 for controlling release and loading of batches of documents using multiple release and loading threads. The operations of the process 500 are described generally as being performed by the system 200. The operations of the process 500 may be performed by one of the components of the system 200 (e.g., the batch engine 216) or may be performed by a combination of the components of the system 200. In some implementations, operations of the process 500 may be performed by one or more processors included in one or more electronic devices.

Figure 6:
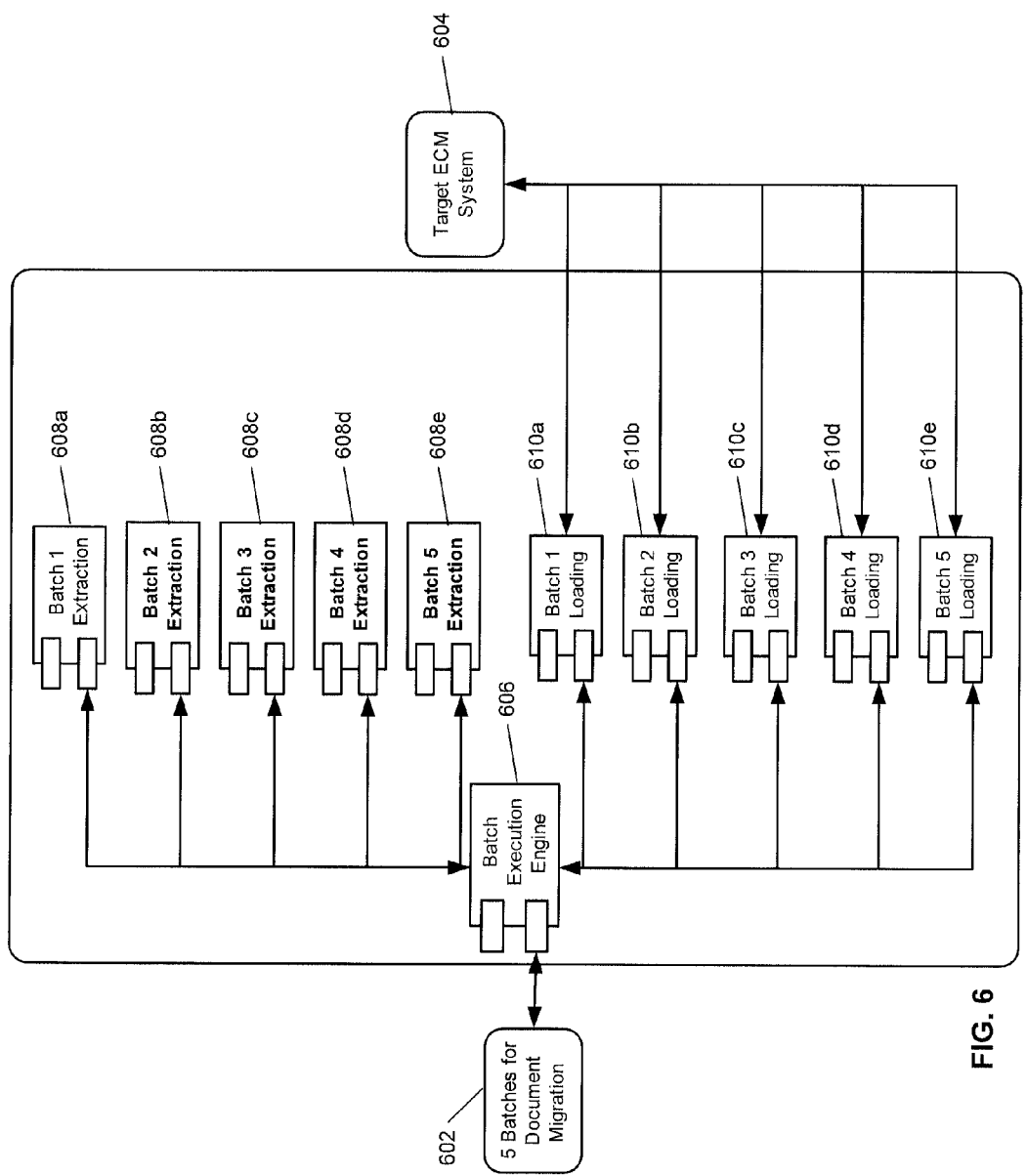

The system 200 defines a release schedule that uses multiple release threads that operate concurrently (510). A batch or set of batches may be scheduled, for example, to be released immediately, to be loaded at a specific date and time, or to be loaded on a recurring basis, such as daily or weekly. For example and as illustrated in FIG. 6, a set of five batches 602 may be scheduled for immediate release.

The system 200 defines a loading schedule that uses multiple loading threads that operate concurrently (520). A batch or set of batches may be scheduled, for example, to be loaded immediately upon successful release, to be loaded at a specific date and time, or to be loaded on a recurring basis, such as daily or weekly. For instance, in the example of FIG. 6, each batch in the set of batches 602 may be scheduled to be loaded to a target system 604 upon successful release of the respective batch.

The system 200 controls release of a batch of documents and metadata using multiple release threads based on the defined release schedule (530). For instance, in the example of FIG. 6, a batch execution engine 606 may create multiple release threads 608a-608e, one release thread for each batch in the set of batches 602. The batch execution engine 606 may create one release thread 608 for each batch in the set of batches 602 if the number of batches in the set of batches 602 plus the number of other release threads already running is less than or equal to a maximum number of release threads configuration setting. The release threads 608a-608e may run in parallel, allowing for faster release than if the batches in the set of batches 602 are released sequentially.

Returning to FIG. 5, the system 200 controls loading of the batch of documents and metadata using multiple loading threads based on the defined loading schedule (540). For instance, in the example of FIG. 6, the batch execution engine 606 may create multiple loading threads 610a-610e, one loading thread for each batch in the set of batches 602. Each of the loading threads 610a-610e may be created by the batch execution engine 606 in response to a notification from a scheduler. The scheduler may instruct the batch execution engine 606 to start a loading process in response to completion of a release (e.g., a successful release performed by one of the release threads 608). The batch execution engine 606 may create a loading thread 610 if the number of total loading threads already running is less than a maximum number of loading threads configuration setting. The loading threads 610a-610e may run in parallel, allowing for faster loading than if the batches in the set of batches 602 are loaded sequentially.

Figure 7:
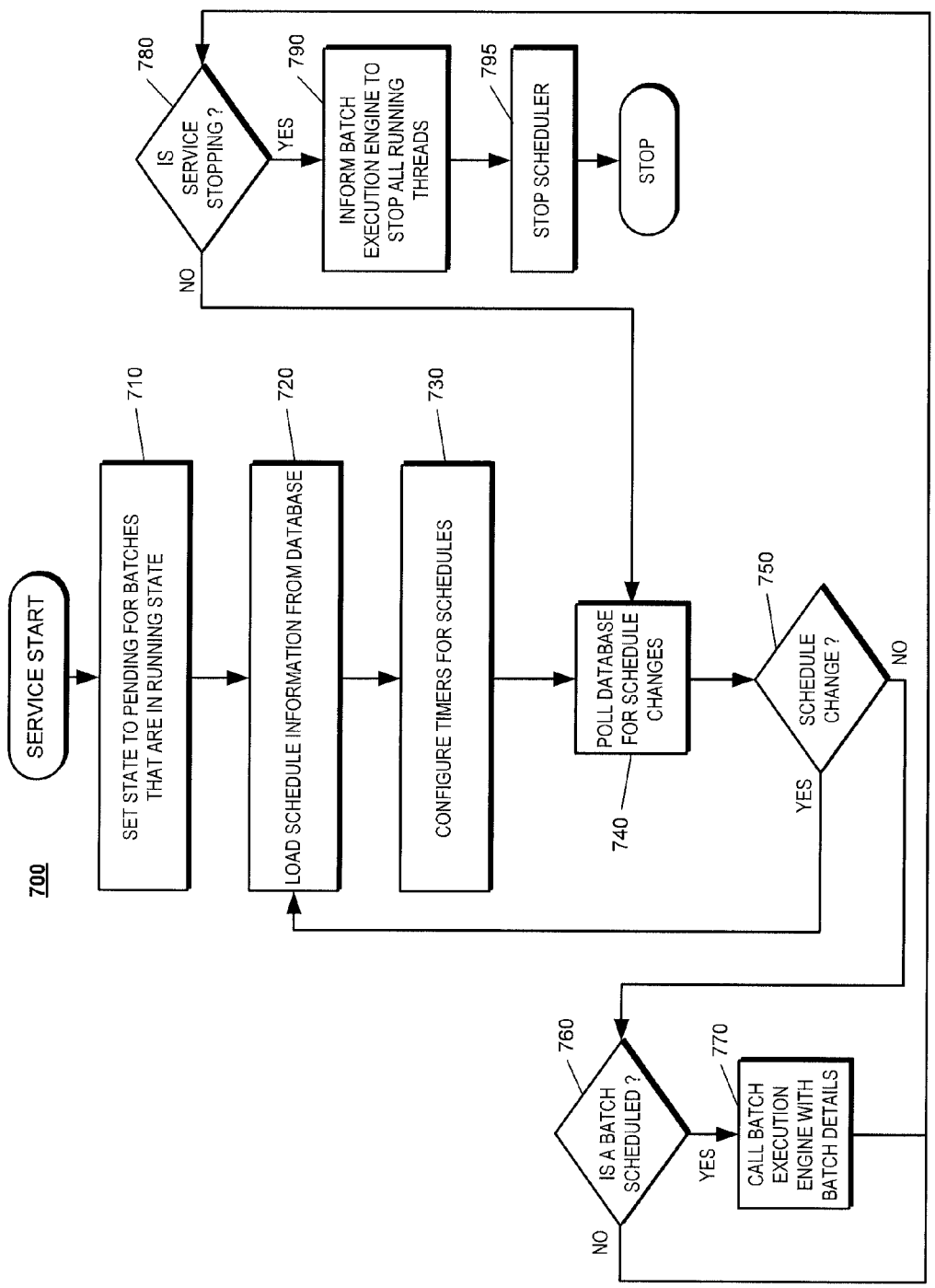

FIG. 7 illustrates a process 700 for scheduling batches. The operations of the process 700 are described generally as being performed by the system 200. The operations of the process 700 may be performed by one of the components of the system 200 (e.g., the batch engine 216) or may be performed by a combination of the components of the system 200. In some implementations, operations of the process 700 may be performed by one or more processors included in one or more electronic devices.

The system 200 sets a state to pending for batches that are in a running state (710). For example, a scheduler service may have terminated due to a program or system crash or system shutdown, in which case batches that were running at the time of the scheduler service termination may have been left marked as being in a running state. Therefore, upon startup of a scheduler service, for each batch with a batch status of "running" in a batch details database table, the batch status may be changed to "pending."

In general, the status of a batch may be "new," "running," "complete," "stopped," or "pending." A batch may have a status of "new" when the batch is first created. When a batch execution engine executes a scheduled batch, the status of the batch may be changed to "running." During batch execution, if the user stops the scheduler service or stops the batch, the status of the batch may be changed to "stopped." If errors occur during release or loading of any documents in the batch, the batch status may be changed to "pending." "Stopped" or "pending" batches may be rescheduled. A batch status of "error" indicates that a general error occurred during batch processing and that a retry of the batch may not be possible. If a batch has documents which have an error status, but the status of the batch itself is not "error," the batch may be rescheduled.

The system 200 loads schedule information from the database (720). For example, schedule information may be loaded upon startup of the scheduler service. As another example, schedule information may be reloaded upon notification from a configuration user interface that changes to schedule information have been made through the configuration user interface.

The system 200 configures timers for schedules (730). For example, the scheduler service may examine schedule information, and may, for example, identify one or more batches which are to be executed on a daily basis, weekly basis, at a specific date/time, at a first available time, or upon completion of another process (e.g., a batch may be scheduled to be loaded upon successful completion of release of the batch). For each batch that is scheduled to run at a specific point in time in the future, the scheduler service may create a timer for the batch, and may calculate a timer interval based on the number of seconds between the current time and the time at which the batch is scheduled to be executed. For example, in some implementations, a timer object may be created and an interval property may be set to the calculated number of seconds.

The system 200 polls the database for schedule changes (740). For example, the scheduler service may poll, on a periodic basis (e.g., once per minute) a database for new schedule information (e.g., schedule information created, modified, or deleted using a configuration user interface). As another example, the scheduler service may be notified by the configuration user interface that schedule information has been created, modified, or deleted through a message or event notification architecture. As yet another example, the scheduler service may poll the database for a change in batch status which may trigger the scheduling of another batch. For example, a loading batch may be scheduled to run immediately after release of batch has completed. The scheduler service may poll the database to identify changes in batch status.

If the system 200 determines that schedule information has changed (750), schedule information is reloaded from the database (e.g., 720). Timers may be added, modified, or deleted based on new schedule information. Schedule information may or may not be updated for batches which are currently in process.

The system 200 determines whether a batch is scheduled (760). For example, a timer associated with a scheduled batch may generate a timer expired event. As another example, an identified change in batch status for a first batch (e.g., completion of batch release) may trigger scheduling of a second batch (e.g., a loading batch).

If a batch is scheduled, the system 200 calls the batch execution engine, providing details about a batch to execute (770). For example, the scheduler service may communicate to the batch execution engine a batch identifier of a batch to execute, and an operation type (e.g., release or load).

The system 200 determines whether the scheduler service is stopping (780). For example, the scheduler service may receive a command from the operating system that the system is shutting down. As another example, the user may terminate the scheduler service. As yet another example, an unrecoverable error or exception condition may be detected in the scheduler service, and the scheduler service may proceed to shut itself down.

If the scheduler service is stopping, the system 200 informs the batch execution engine to stop all running threads (790). For example, the scheduler service may send a message to the batch execution engine to stop all running threads. The batch execution engine may, for example, send a stop request to each thread in a list of running threads. The batch execution engine may respond with an indication of whether all running threads have been successfully stopped. The batch execution engine may wait for a predetermined amount of time (e.g., one minute) before determining whether all threads have successfully stopped.

The scheduler service may also notify the batch execution engine to stop some or all running threads in response to a request from a configuration user interface to stop one or more batches. As in the case of a system or scheduler service shutdown, the batch execution engine may respond with an indication of whether all batches which have been requested to stop have actually been stopped (as determined, for example, after a predetermined amount of time has passed).

The system 200 stops the scheduler (795). The scheduler may, for example, perform final shutdown processing such as to free any used resources. In some implementations, if the batch execution engine indicates that not all running batches have been successfully stopped, the scheduler may continue running.

If the schedule service is not stopping (e.g., as determined in step 780), the system 200 continues to poll the database for new schedules (e.g., 740).

Figure 8:
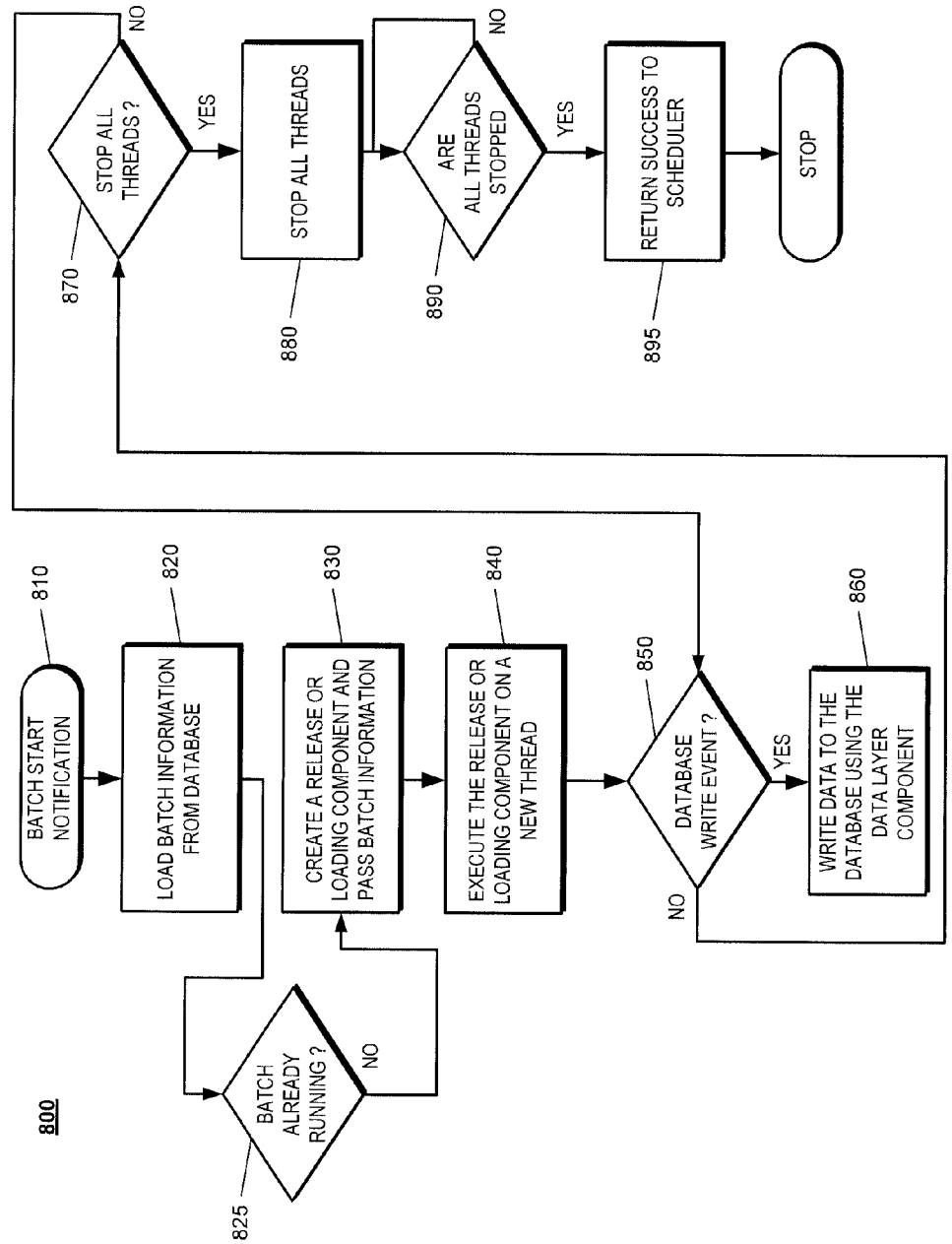

FIG. 8 illustrates a process 800 for executing a batch. The operations of the process 800 are described generally as being performed by the system 200. The operations of the process 800 may be performed by one of the components of the system 200 (e.g., the batch engine 216) or may be performed by a combination of the components of the system 200. In some implementations, operations of the process 800 may be performed by one or more processors included in one or more electronic devices.

The system 200 receives a notification to start a batch (810). For example, a batch execution engine may receive a notification from a scheduler service. The notification may include an identifier of a batch to execute and an operation type to perform (e.g., release or load).

The system 200 loads batch information from the database (820). For example, batch information including batch status may be obtained from a database, using a data layer component.

The system 200 determines whether the batch is already running (825). For example, the batch execution engine may determine whether the batch is running by examining a batch status value.

If the batch is not already running, the system 200 creates a release or loading component and passes batch information (830). For example, the batch execution may create a release component if the operation type indicated by the notification received from the scheduler service indicates an release operation type and may create a loading component if the notification indicates a loading operation type.

The system 200 executes the release or loading component on a new thread (840). Before creating release or loading thread, the batch execution engine may determine whether the number of running release or loading threads exceeds a maximum number of release or loading threads, respectively. For example, a maximum release thread count or a maximum loading thread count may be retrieved from a database using a data layer component. The batch execution engine may maintain a list of running release threads and a list of running loading threads. If the operation type is release and a maximum release thread count is more than the number of running release threads, a new release thread may be created and the release component may be executed using the new thread. Executing release component is described in more detail below with respect to FIG. 9.

Figure 9:
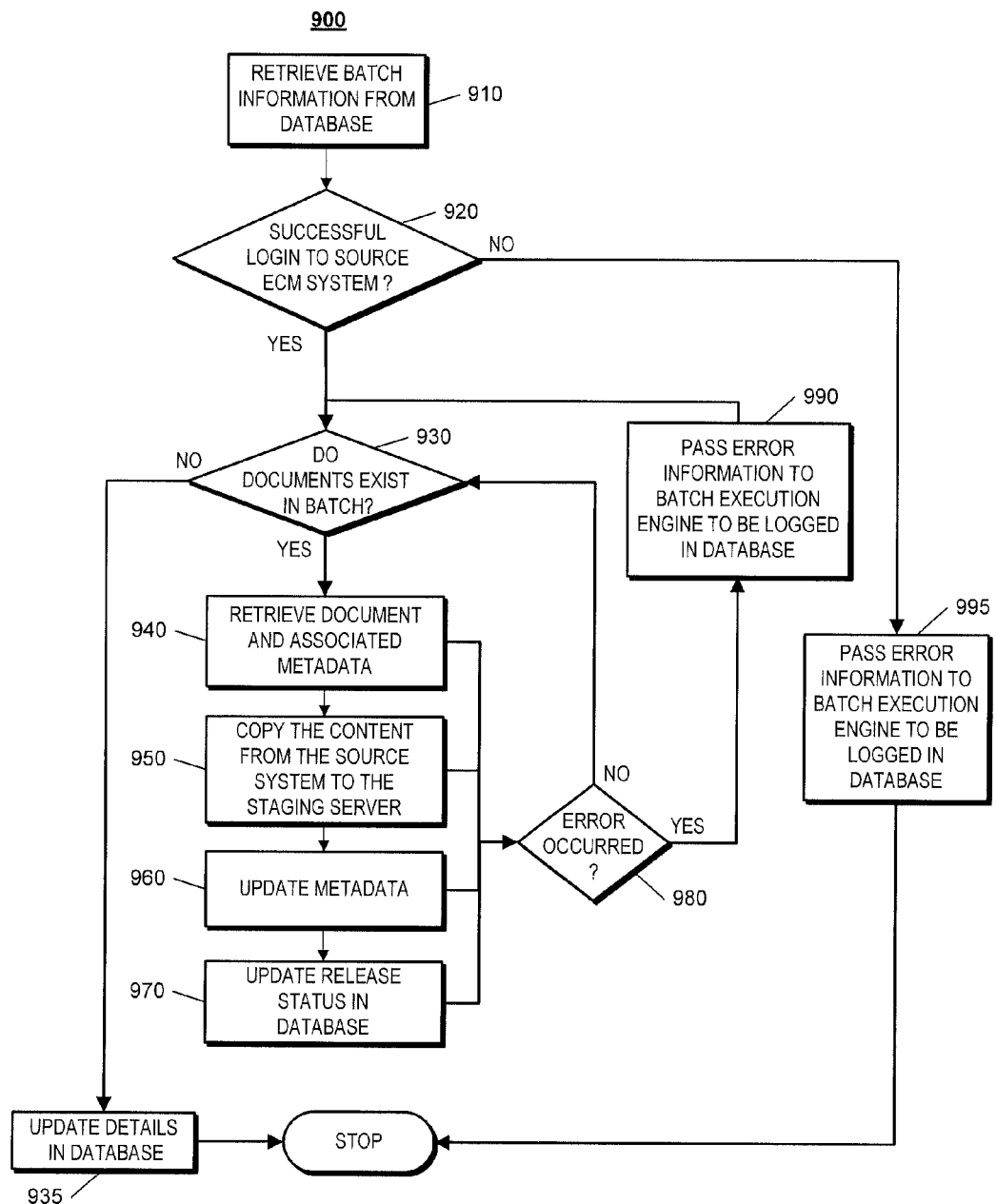

FIG. 9 illustrates a process 900 for executing release component. The operations of the process 900 are described generally as being performed by the system 200. The operations of the process 900 may be performed by one of the components of the system 200 (e.g., the batch engine 216) or may be performed by a combination of the components of the system 200. In some implementations, operations of the process 900 may be performed by one or more processors included in one or more electronic devices.

The system 200 retrieves batch details from the database (910). For example, upon being created, the release component may receive a batch identifier from the batch execution engine, and the release component may retrieve additional batch information from a database. In some implementations, the batch execution engine retrieves the batch information and communicates the batch information to the release component. Batch information may include, for example, batch status and information indicating which documents to release. For example, batch information may refer to a text file which includes a list of document identifiers or may refer to a query which defines criteria for documents to migrate. If the batch status is "new," "pending," or "stopped," the release component may continue, but if the batch status is "complete" or "error," an error message may be generated and the release process may stop.

The system 200 determines whether an attempt to log in to the source ECM system is successful (920). For example, the system 200 may attempt to log in to the source ECM system using username and password information retrieved from a database or received from user input.

If the login to the source ECM system is successful, the system 200 determines whether documents exist in the batch (930). For example, batch information retrieved from a database may indicate a total number of documents associated with the batch. As another example, a query associated with the batch may be performed and query results may be examined to determine whether there are any documents which match the query. As yet another example, if batch information refers to a set of document identifiers (e.g., a text file), the set of document identifiers may be examined to determine whether the set includes any document identifiers or whether the set is empty.

If documents exist in the batch, the system 200 retrieves, for each document, the document and associated metadata (940). A batch status may be set to "running". Document details for each document associated with the batch may be retrieved from a source system. Since the batch status is "new," the release component may confirm that the release status for each document is also "new". In some implementations, a library object may be created and each identified document may be retrieved using the library object. In some implementations, metadata for a document may be retrieved by querying a document object for an associated class description. In some implementations like for file system, the metadata for the documents may be retrieved from a delimited index file provided along with the documents.

The system 200 copies the content of each document from the source ECM system to the staging server (950). In some implementations, one or more source ECM system utilities may be used to copy a document to a local cache of the source ECM system and to subsequently copy the document from the local cache to the file system of the staging server. A document object may store folder information describing one or more folders which include the document. The folder information may be used to copy the document to corresponding folders on the staging server. The release status of each copied document may be updated to "completed." If an error occurs during retrieval or copying of a document, the release status for the document may be set to "error." Document status updates may be written as migration records to a migration log. For each successfully released document, a "total documents released" field associated with the released batch may be incremented in the database.

The system 200 updates metadata information (960). Metadata information may be copied, for example, to one or more metadata XML files.

The system 200 updates release status in the database (970). For example, if every document in the batch is successfully released, the release status of the batch may be changed to "completed." If one or more documents have the release status of "error," the release status of the batch may be changed to "pending." To determine whether all documents have been successfully released a "total number of documents" field may be compared to a "total documents released" field. The "total documents released" field may reflect the number of documents with release status of "ignored" or "completed." If a batch status is changed to "completed," a "load status" field may be set to "new." Batch status updates may be written as migration records to a migration log.

The system 200 determines whether an error occurred (980). For example, it may be determined whether an error occurred during document retrieval (e.g., step 940), content copying (e.g., step 950), metadata updating (e.g., step 960), or database updating (e.g., step 970). If it is determined that an error occurred, the system 200 passes error information to the batch execution engine, for logging of error information in the database (990). For example, a batch status may be set to "pending" and corresponding error information may be stored in the database. Error information may include, for example, a batch identifier, a document identifier, error type, error description, operation type (e.g., load, release), time of error, and an indication of a software code module or object from which an error was generated.

If documents do not exist in the batch (e.g., as determined in step 930), the system 200 updates details in the database (935). For example, among other updates, a batch status may be set to "complete".

If the logon to the source ECM system is not successful (e.g., as determined in step 920), the system 200 passes error information to the batch execution engine, for logging of error information in the database (995). For instance, a batch status may be set to "pending" and corresponding error information may be stored in the database. Error information may include, for example, an indication that the logon to the source ECM system was not successful.

Returning to FIG. 8, if the operation type is loading and a maximum loading thread count is more than the number of running loading threads, a new loading thread may be created and the loading component may be executed using the new loading thread. Executing a loading component is described in more detail below with respect to FIG. 10.

Figure 10:
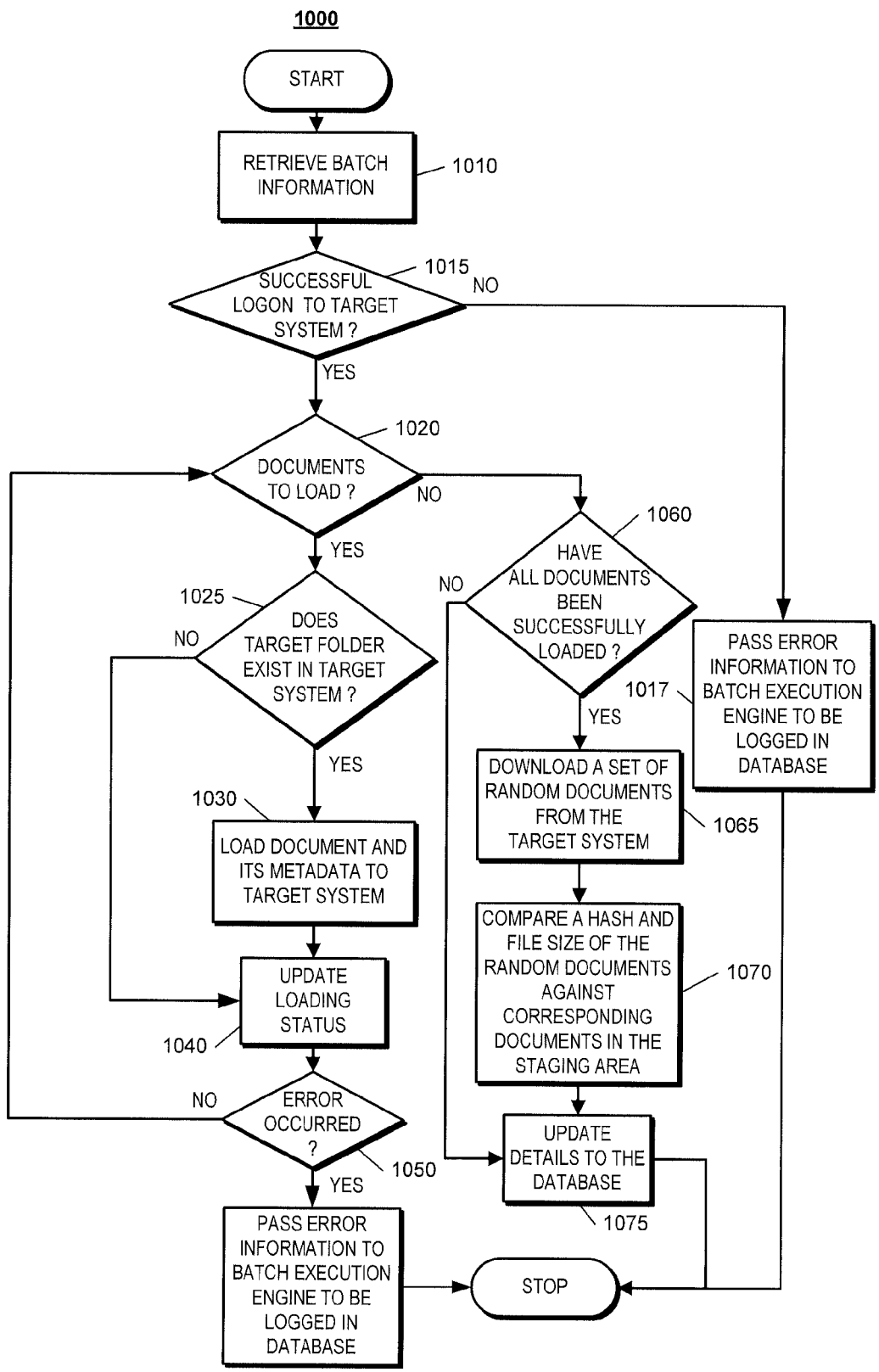

FIG. 10 illustrates a process 1000 for executing a loading component. The operations of the process 1000 are described generally as being performed by the system 200. The operations of the process 1000 may be performed by one of the components of the system 200 (e.g., the batch engine 216) or may be performed by a combination of the components of the system 200. In some implementations, operations of the process 1000 may be performed by one or more processors included in one or more electronic devices.

The system 200 retrieves batch information (1010). For example, upon being created, a loading component may receive a batch identifier from the batch execution engine, and the loading component may retrieve additional batch information from a database. In some implementations, the batch execution engine retrieves the batch information and communicates the batch information to the loading component. Batch information may include, for example, batch status and information indicating which documents to load. For example, batch information may refer to a text file which includes a list of document identifiers. If the batch status is "new," "pending," or "stopped," the loading component may continue, but if the batch status is "complete" or "pending," due to error an error message may be generated and the loading process may stop.

The system 200 determines whether an attempt to log in to the target ECM system is successful (1015). For example, the system 200 may attempt to log in to the target ECM system using username and password information retrieved from a database or received based on user input.

If the login to the target ECM system is not successful, the system 200 passes error information to the batch execution engine, for logging of error information in the database (1017). For instance, a batch status may be set to "pending" and corresponding error information may be stored in the database. Error information may include, for example, an indication that the logon to the target ECM system was not successful.

If the login to the target ECM system is successful, the system 200 determines whether there are documents to load (1020). A batch status may be set to "running" and a prior batch status may be recorded. Document details for each document associated with the batch may be retrieved from a document details table in the database. If the prior batch status is "new," the loading component may confirm that a loading status for each document is also "new." If the prior batch status is "pending" or "stopped," the number of documents associated with the batch which have a loading status of "retry" or "new" may be identified.

If there are documents to load, the system 200 selects a document and determines whether the target folder(s) where the document is to be copied exist on the target system (1025). In some implementations, the system 200 may assume that the folder structure of the target system corresponds to the folder structure of the staging server.

If the target folder(s) exist, the system 200 loads the document and its associated metadata to the target ECM system (1030). For example, the document may be copied from the staging server to the target ECM system. In some implementations, the document and metadata may be copied from the staging server to the target ECM system using a web service proxy class. A check-in operation may be performed as part of copying a document to the target ECM system. Minor and/or major version information may be set for the document on the target ECM system. A minor version may be set to false, since it may be assumed that a copied document is a published version of the document on the target ECM system. Metadata attributes such as a document title, content type, and content size may be set. Metadata information may be updated using a class description property.

To place a document in a particular folder, a document may be associated with the folder, such as by the creation of a referential containment relationship object. After copying a document, the loading component may confirm that the copy was successful by querying the target ECM system for existence of a document with a document identifier used created by the loading component.

The system 200 updates a loading status of the document (1040). For example, if the target folder(s) do not exist (e.g., as determined in step 1025), a loading status for the document may be updated in the database. For example, a loading status may be set to "error" for the document.

As another example, if the document was loaded to the target ECM system and if the target ECM system confirms the existence of the document, a loading status of the document may be set to "complete" and a "total documents loaded" field may be incremented in the database. If the target ECM does not confirm the existence of the document, a loading status for the document may be set to "error." Document status updates may be written as migration records to a migration log.

The system 200 determines whether a batch error occurred during loading (1050). A batch error may be, for example, an error other than an error associated with the loading of a particular document. For example, an exception condition may be encountered in a software object. If a batch error occurred during loading, the system 200 passes error information to the batch execution engine for logging of error information in the database (1055). For example, a batch status may be set to "pending" and corresponding error information may be stored in the database. Error information may include, for example, a batch identifier, a document identifier, error type, error description, operation type (e.g., load, release), time of error, and an indication of a software code module or object from which an error was generated.

If a batch error has not occurred during loading, the system 200 determines whether there are more documents to load (e.g., step 1020). If there are more documents to load, the system 200 selects a next document. If there are no more documents to load, the system 200 determines whether all documents included in the batch have been successfully loaded (1060). To determine whether all documents have been successfully loaded, a "total number of documents" field may be compared to a "total documents loaded" field. If the "total number of documents" field equals the "total documents loaded" field, the system 200 may determine that all documents for the batch have been successfully loaded. As another example, a query may be performed to determine whether one or more documents associated with the batch has a load status of "error." If one or more documents have a load status of "error," the system 200 may determine that all documents have not been successfully loaded.

If all documents have been successfully loaded, the system 200 downloads a set of randomly-selected documents from the target ECM system (1065). For example, ten documents may be randomly selected and downloaded from the target ECM system, and corresponding documents may be retrieved from the staging server.

The system 200 compares a hash and file size of the random documents against a hash and file size of corresponding documents in the staging area (1070). For example, for each of the randomly selected documents, the loading component may determine whether the file size of the version of the document downloaded from the target ECM system matches the file size of the version of the document retrieved from the staging server. If the compared file sizes match, a target hash value may be computed by performing a hash operation on the contents of the version of the document downloaded from the target ECM system and a staging hash value may be computed by performing the same hash operation on the contents of the version of the document retrieved from the staging server.

The system 200 updates details to the database (1075). For example, if the target hash value equals the staging hash value, a loading status for the batch may be changed to "completed." If the target hash value does not equal the staging hash value, a loading status for the batch may be set to "error." If one or more documents associated with the batch have a load status of "error," the load status of the batch may be set to "pending." Batch status updates may be written as migration records to a migration log. If the loading of a batch has successfully completed, associated documents may be deleted from the staging server.

Returning to FIG. 8, the system 200 determines whether a database write event has been received (850). For example, the batch execution engine may provide a queue which may be used by release and loading components to write information to the database. Since multiple release and multiple loading components may be running simultaneously on separate threads, the queue may be implemented as a thread-safe queue.

If a database write event has been received, the system 200 writes data to the database using the data layer component (860). For instance, the system 200 writes data to the database to track the write event related to the migration operation.

The system 200 determines whether all threads should be stopped (870). For example, the batch execution engine may receive a notification to stop all threads from the scheduler service.

If all threads should be stopped, the system 200 issues a request to stop all threads (880). For example, the batch execution may send a stop message to each release thread referenced on a list of running release threads and to each loading thread referenced on a list of running loading threads.

The system 200 determines whether all threads have been stopped (890). For example, the batch execution engine may determine whether a confirmation response has been received from each release thread and from each loading thread. The batch execution engine may wait for a predetermined amount of time (e.g., one minute) before determining whether a confirmation response has been received from all threads.

If all threads have been stopped, the system 200 returns success to the scheduler (895). If all threads have not been stopped, the system 200 may continue to wait until all threads have been stopped.

Figure 11:
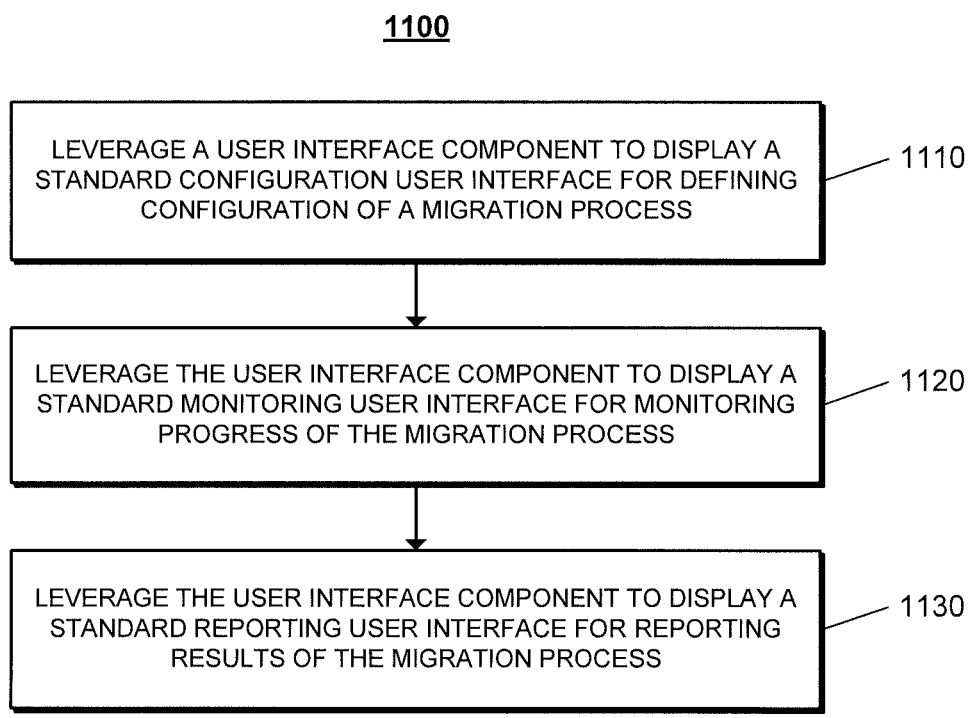

FIG. 11 illustrates a process 1100 for leveraging a user interface component for a migration process. The operations of the process 1100 are described generally as being performed by the system 200. The operations of the process 1100 may be performed by one of the components of the system 200 (e.g., the batch engine 216) or may be performed by a combination of the components of the system 200. In some implementations, operations of the process 1100 may be performed by one or more processors included in one or more electronic devices.

The system 200 leverages a user interface component to display a standard configuration user interface for defining configuration of a migration process (1110). A user may use the user interface component to define, for example, an release schedule, a loading schedule, and various user preferences. The standard configuration user interface may provide standardized configuration options and controls regardless of which systems are being used in the migration process.

Figure 12:
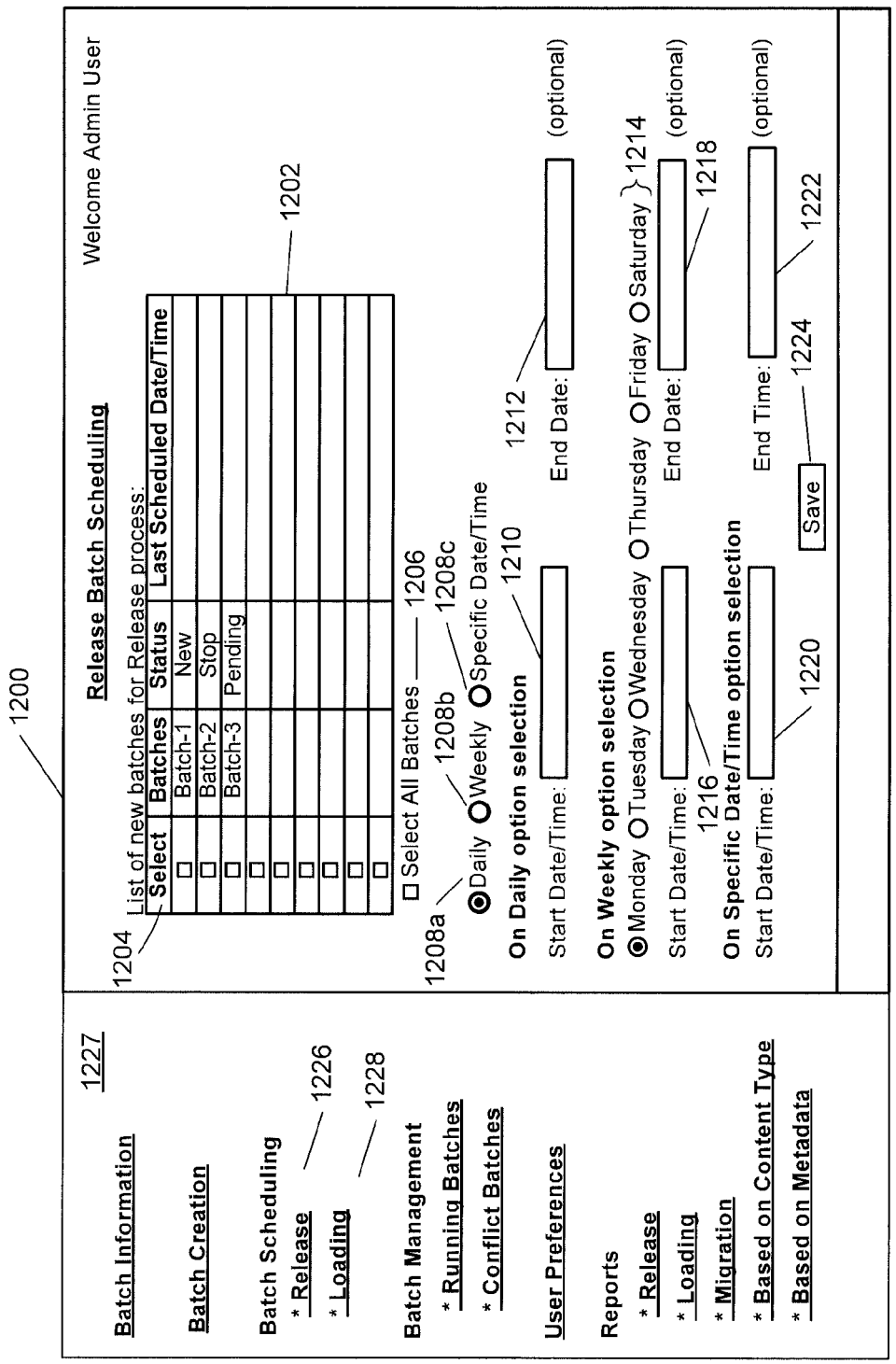

For example and as shown in FIG. 12, a user interface 1200 may be used to define release schedule. A table 1202 lists batches available for scheduling. For example, the table 1202 may list batches with a status of "new," "pending," or "stopped." For each batch, a batch identifier, batch status, and last scheduled date/time (if any) may be shown. The user may select one or more batches using a set of selection controls 1204, or the user may select all available batches using a control 1206. The user may define a daily, weekly, or specific date/time release schedule for the selected batches using controls 1208, 1210, 1212, 1214, 1216, 1218, 1220, and 1222. Schedule information may be saved to a database using a save control 1224.

A user may define a daily, weekly, or specific-time release schedule for the selected batches by selecting one of a set of option controls 1208. For example, the user may define a daily release schedule by selecting an option control 1208*a*, a weekly release schedule by selecting an option control 1208*b*, or a specific date/time schedule by selecting an option control 1208*c*. If the option control 1208*a* is selected, the user may enter a start date and time using a control 1210. A user may optionally define an end date and time using a control 1212. The selected batches will be released daily, starting on the date entered, at the specific time entered. If an end date is defined, the selected batches will be released daily until the end date is reached. If an end date is not specified, each of the selected batches may be released daily until the user stops a batch, until an end date is defined, or until all documents have been released.

If the option control 1208*b* is selected, the user may select a day of week for a weekly release schedule by selection one of a set of option controls 1214. The user may enter a start date and time using a control 1216. A user may optionally define an end date and time using a control 1218. The selected batches will be released weekly, starting on the date entered, on the selected day of the week, at the specific time entered. If an end date is defined, the selected batches will be released weekly until the end date is reached. If an end date is not specified, each of the selected batches may be released weekly until the user stops a batch, until an end date is defined, or until all documents have been released.

A recurring weekly or a daily schedule may be desirable, for example, for batches which are defined as documents matching criteria defined by a query. The associated query may be run each time the batch is scheduled to run, to identify documents matching the query criteria. For batches defined by a specific set of documents identifiers, it may be desirable to schedule such batches for a one-time release at a specific date and time. For example, the user may select the option control 1208*c*, and may define a start date and time using a control 1220. The selected batches will be released at the defined date and time. A user may optionally define a desired end date and time using a control 1222. For example, desired end times of all scheduled batches may be taken into account by the scheduler. For example, priority may be given (e.g., thread priority, number of threads, actual thread start time) to batches with earlier desired end times.

The user interface 1200 may be launched, for example, by selecting a link 1226 from a menu area 1227. The menu area 1227 includes links to other user interfaces and reports, including a link 1228 for a loading batch scheduling interface. For example, if a user selects the link 1228, a user interface 1300 illustrated in FIG. 13 may be displayed. The user interface 1300 is similar to the user interface 1200, in that loading batches may be scheduled on a daily, weekly or specific date/time basis. The available batches displayed in a table 1302 are batches for which loading status indicates that loading for those batches is either "new", "pending" or "stop".

Other than batch scheduling, other configuration user interfaces may be launched using a menu area 1304. For example, detailed batch information may be displayed by selecting a link 1306. As another example, a user interface for batch creation may be displayed by selecting a link 1308. A link 1310 may be selected to launch a user interface for configuring user preferences. For example and as illustrated in FIG. 14, a user interface 1400 may be displayed in response to selection of the link 1310.

A user may select a control 1402 to configure a batch size (e.g., number of documents released or loaded per batch). The batch size may be used, for example, as a default batch size when creating batches. A user may change, on a batch creation interface, a batch size for a particular batch to a value different than the default batch size. Controls 1404, 1406, 1408, 1410, and 1412 may be used to configure a database server (e.g., IP (Internet Protocol) address or domain name), database type (e.g., Oracle, SQL (Structured Query Language) Server), database name, database username for automatic login, and password for database username, respectively. A database may be used, for example, for storing configuration data, migration records, and other data.

A maximum number of release and loading threads may be configured using controls 1414 and 1416, respectively. A batch execution engine may ensure that the number of created release and loading threads does not exceed the settings entered using the controls 1414 and 1416, respectively. Username and password information for the source ECM system may be configured using controls 1418 and 1420, respectively. If the username and password for the target ECM system are the same as the username and password for the source ECM system, the user may select a control 1421, otherwise a user may enter a username and password for the target ECM using controls 1422 and 1424, respectively. In implementations where documents to migrate are identified by a set of document identifiers, a control 1426 may be selected, for example, to browse for and select a text file which includes a list of document identifiers. The text file including a list of document identifiers may be generated, for example, using one or more utilities provided by the source ECM system. User preferences may be saved to the database by selecting a save control 1428.

Returning to FIG. 11, the system 200 leverages the user interface component to display a standard monitoring user interface for monitoring progress of the migration process (1120). The standard monitoring user interface may provide standardized monitoring data, options, and controls regardless of which systems are being used in the migration process.

Figure 15:
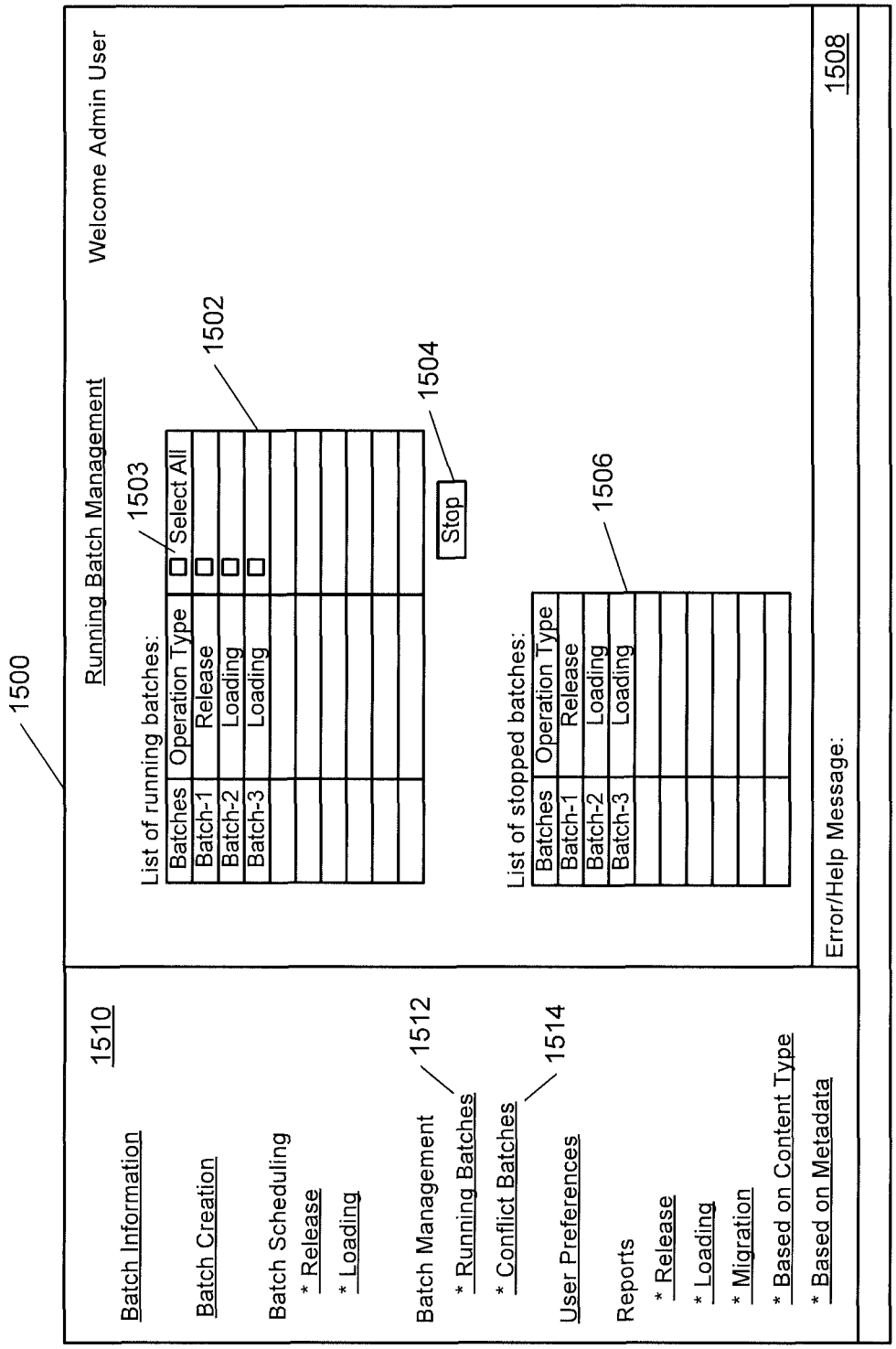

For example and as illustrated in FIG. 15, a user interface 1500 may be displayed for monitoring running batches. Running batches may be displayed in a table 1502. For each running batch, a batch identifier, an operation type (e.g., release or loading) and other batch information may be displayed. A user may select one, multiple, or all running batches using selection controls displayed in a column 1503.

Selected batches may be stopped by selecting a stop control 1504. A list of stopped batches is displayed in a table 1506. In some implementations, other controls may be displayed, such as one or more controls which enable a user to restart a stopped batch. Error and help messages may be displayed in a messages area 1508. For example, if a request to stop a batch cannot be completed for some reason, a message may be displayed in the messages area 1508.

Figure 16:
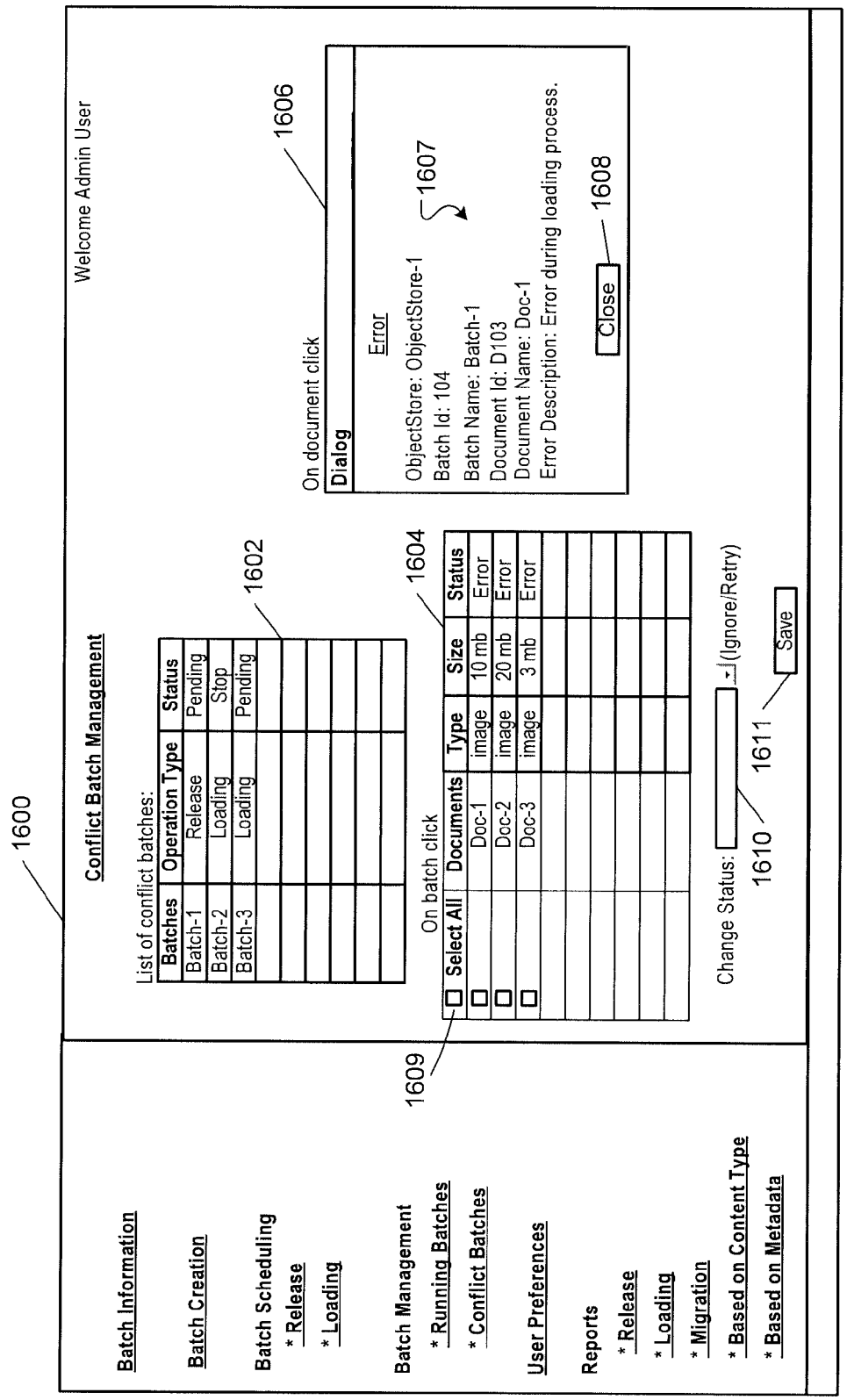

The user interface 1500 may be launched, for example, by selecting a link 1512 from a menu area 1510. The menu area 1510 includes links to other user interfaces, such as a link 1514 for managing conflict batches. For example, if a user selects the link 1514, a user interface 1600 illustrated in FIG. 16 may be displayed.

The user interface 1600 may be used for monitoring and resolving errors which have occurred during release or loading processes. An error may occur, for example, due to metadata attribute mismatch, invalid or missing metadata attribute values, missing documents, or missing folder or other structural issues on the target ECM system. A list of conflict batches may be displayed in a table 1602. A conflict batch may be a batch which has a status of pending or stopped and which has an error condition for the batch in general or has one or more documents in an error state. For each conflict batch, a batch identifier, operation type, batch status, and other batch information may be displayed.

In response to selection of a batch in the table 1602, information corresponding to error documents included in the batch may be displayed in a table 1604. For example, for each error document, a document identifier, a document type, a document size, and a document status may be displayed. In response to selection of a document in the table 1604, a user interface 1606 may be displayed which presents detailed information 1607 about the error for the selected document. The user may select a control 1608 to close the user interface 1606.

The user may select one, multiple, or all documents in the table 1604 using one or more selection controls in a column 1609. With one or more documents selected in the table 1604, the user may use a control 1610 to change the status of the selected documents to either "retry" or "ignore." Batches which have one or more documents with a status of "retry" may have a batch status of "pending," and may be rescheduled, to retry release or loading of those documents with a "retry" status. Retry of release or loading may not occur for documents with an "ignore" status. The table 1604 may be updated to reflect changes in document status. A user may save document status changes by selecting a save control 1611. If, upon saving document status changes, all error documents for a batch have a status of "ignore," the release or loading status of the batch may be set to a value of "completed." Setting a document status to "ignore" may result in an increment to a "total documents released" field in the database.

Returning to FIG. 11, the system 200 leverages the user interface component to display a standard reporting user interface for reporting results of the migration process (1130). The standard reporting user interface may provide standardized reporting data regardless of which systems are being used in the migration process.

Figure 17:
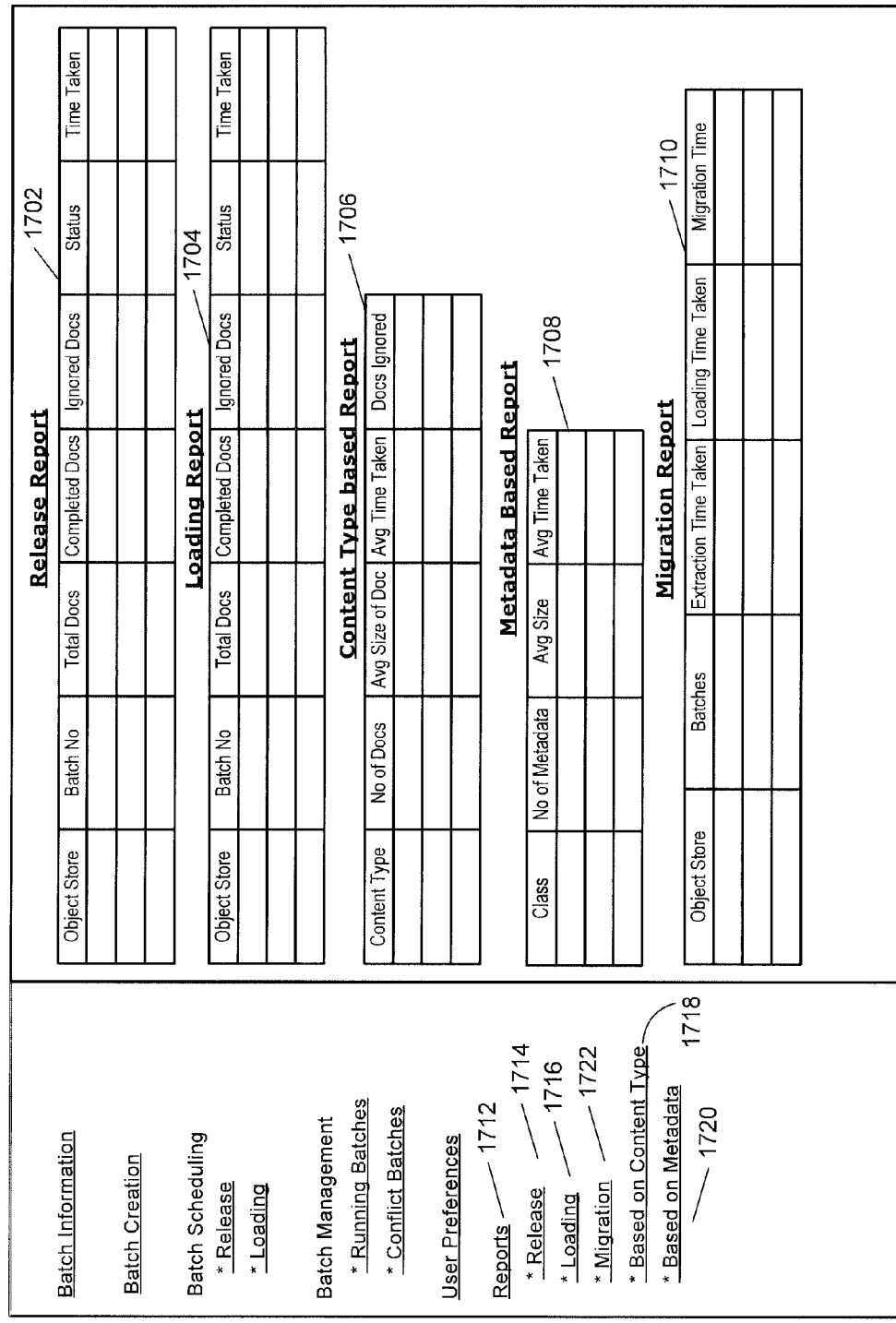

For example and as illustrated in FIG. 17, a user interface 1700 may be displayed. The user interface 1700 displays an release report 1702, a loading report 1704, a report 1706 based on content type, a metadata-based report 1708, and a migration report 1710. The reports are displayed individually as a user interface 1700, such as in response to selection of links 1714, 1716, 1718, 1720, and 1722, respectively.

The release report 1702 displays details for released batches. For example, for each released batch, the following information may be displayed: an object store or repository of the target ECM system where the batch is migrated, a batch identifier, the total number of documents associated with the batch, the number of documents that have been successfully released, the number of error documents that have been ignored, the status of the batch (e.g., "new," "stopped," "pending," "running," "complete"), and the release time to date for the batch.

The loading report 1704 displays details for loaded batches. For example, for each loaded batch, the following information may be displayed: an object store or repository of the target ECM system where the batch is migrated, a batch identifier, the total number of documents associated with the batch, the number of documents that have been successfully loaded, the number of error documents which have been ignored, the status of the batch (e.g., "new," "stopped," "pending," "running," "complete"), and the loading time to date for the batch.

The report 1706 based on content type may be used to measure migration performance based on content type. For example, the report 1706 may display details for each type of content migrated, such as a content type, a total number of documents migrated for that content type, an average size of document of that content type, an average migration time per document for documents of that content type, and a number of error documents ignored for that content type.

The metadata-based report 1708 may be used to measure migration performance based on type of metadata. For example, the report 1708 may display details for each class of metadata migrated, such as a metadata class, the number of metadata attributes of that class, the average size of metadata for each metadata class, and the average migration time per metadata item of that metadata class.

The migration report 1710 may be used to measure the performance of an entire migration. The migration report 1710 may be grouped by object store or repository of the target ECM system. For each object store or repository, the migration report 1710 may display the number of batches migrated for that object store or repository, a total release time for migrating of batches for that object store, a total loading time for batches of that object store, and a total migration time for batches of that object store (e.g., calculated as the sum of the total release time and total loading time).

Figure 18:
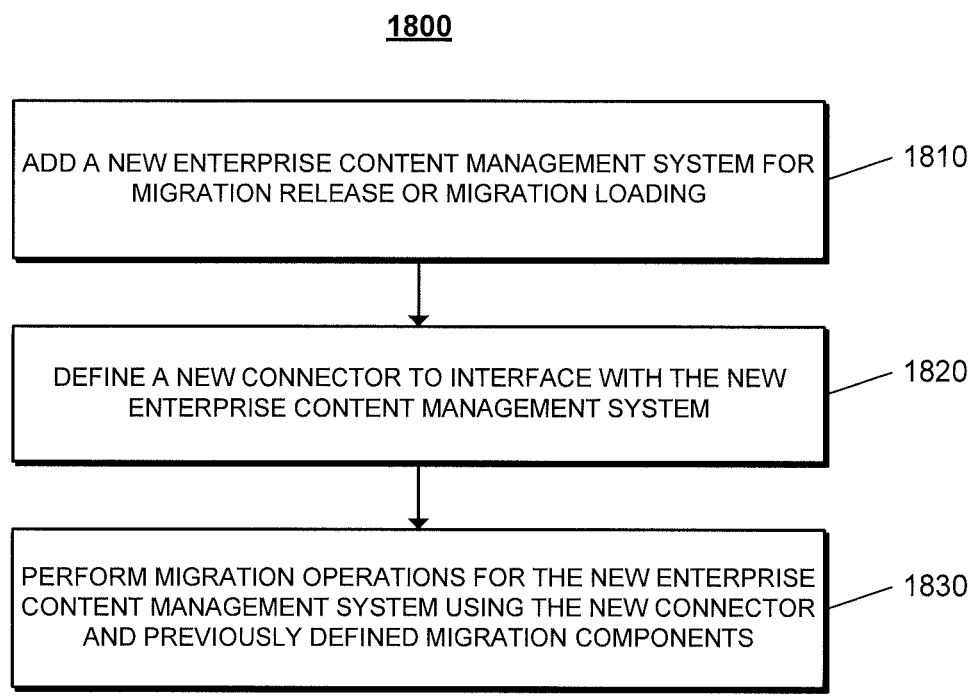

FIG. 18 illustrates a process 1800 for performing migration operations for a new ECM system as source or target. The operations of the process 1800 are described generally as being performed by the system 200. The operations of the process 1800 may be performed by one of the components of the system 200 (e.g., the batch engine 216) or may be performed by a combination of the components of the system 200. In some implementations, operations of the process 1800 may be performed by one or more processors included in one or more electronic devices.

Figure 19:
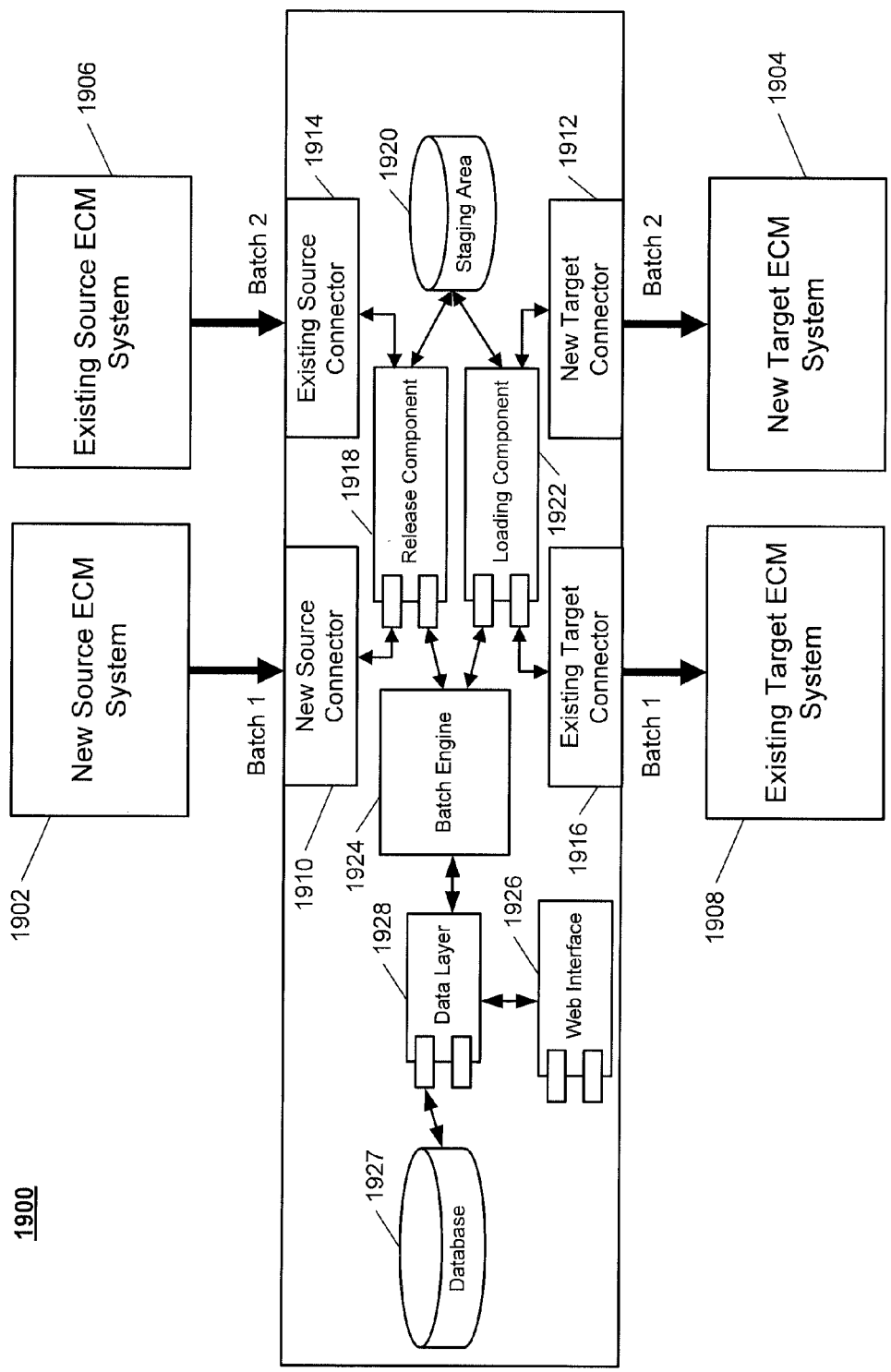

The system 200 adds a new enterprise content management system for migration release or migration loading (1810). For example the system 200 may be configured to interface with a new source or new target ECM system introduced to the marketplace or to a new source or new target ECM system which has not been otherwise previously included in the system 200. For example and as show in FIG. 19, a new source ECM 1902 and/or a new target ECM system 1904 may be added to a system 1900 which includes an existing source ECM system 1906 and an existing target ECM system 1908.

The system 200 defines a new connector to interface with the new enterprise content management system (1820). For instance, in the example of FIG. 19, a new source connector 1910 is defined and is configured to interface with the new source ECM system 1902 and a new target connector 1912 is defined and is configured to interface with the new target ECM system 1904. The new source connector 1910 may be defined without requiring modification to an existing source connector 1914 and the new target connector 1912 may be defined without requiring modification to an existing target connector 1916.

The system 200 performs migration operations for the new enterprise content management system using the new connector and previously defined migration components (1830). For example, a release component 1918 may use the new source connector 1910 to release a first batch of documents from the new source ECM system 1902 and may copy the released documents to a staging area 1920. A loading component 1922 may retrieve the first batch of documents from the staging area 1920 and may load them to the existing target ECM system 1908 using the existing target connector 1916. As another example, the release component 1918 may use the existing source connector 1914 to release a second batch of documents from the existing source ECM system 1906 and may copy the released documents to the staging area 1920. The loading component 1922 may retrieve the second batch of documents from the staging area 1920 and may load them to the new target ECM system 1904 using the new target connector 1912.

The release component 1918 and the loading component 1922 may each communicate with a batch engine 1924. Migrations to both the new target ECM system 1904 and the existing target ECM system 1908 may be configured using a web interface component 1926. Both the web interface component 1926 and the batch engine 1924 may access a database 1927 using a data layer component 1928.

Figure 20:
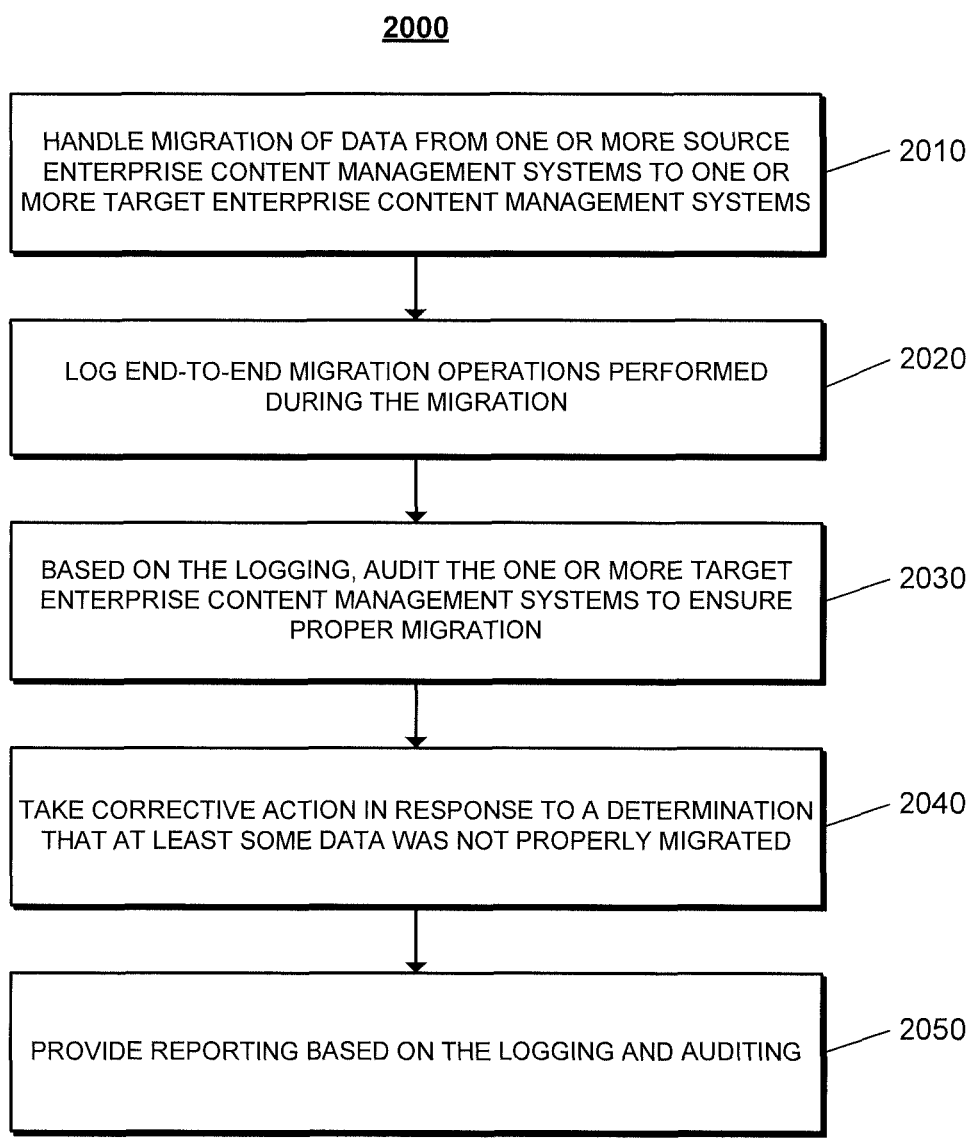

FIG. 20 illustrates a process 2000 for auditing a migration between a source ECM system and a target ECM system. The operations of the process 2000 are described generally as being performed by the system 200. The operations of the process 2000 may be performed by one of the components of the system 200 (e.g., the batch engine 216) or may be performed by a combination of the components of the system 200. In some implementations, operations of the process 2000 may be performed by one or more processors included in one or more electronic devices.

Figure 21:
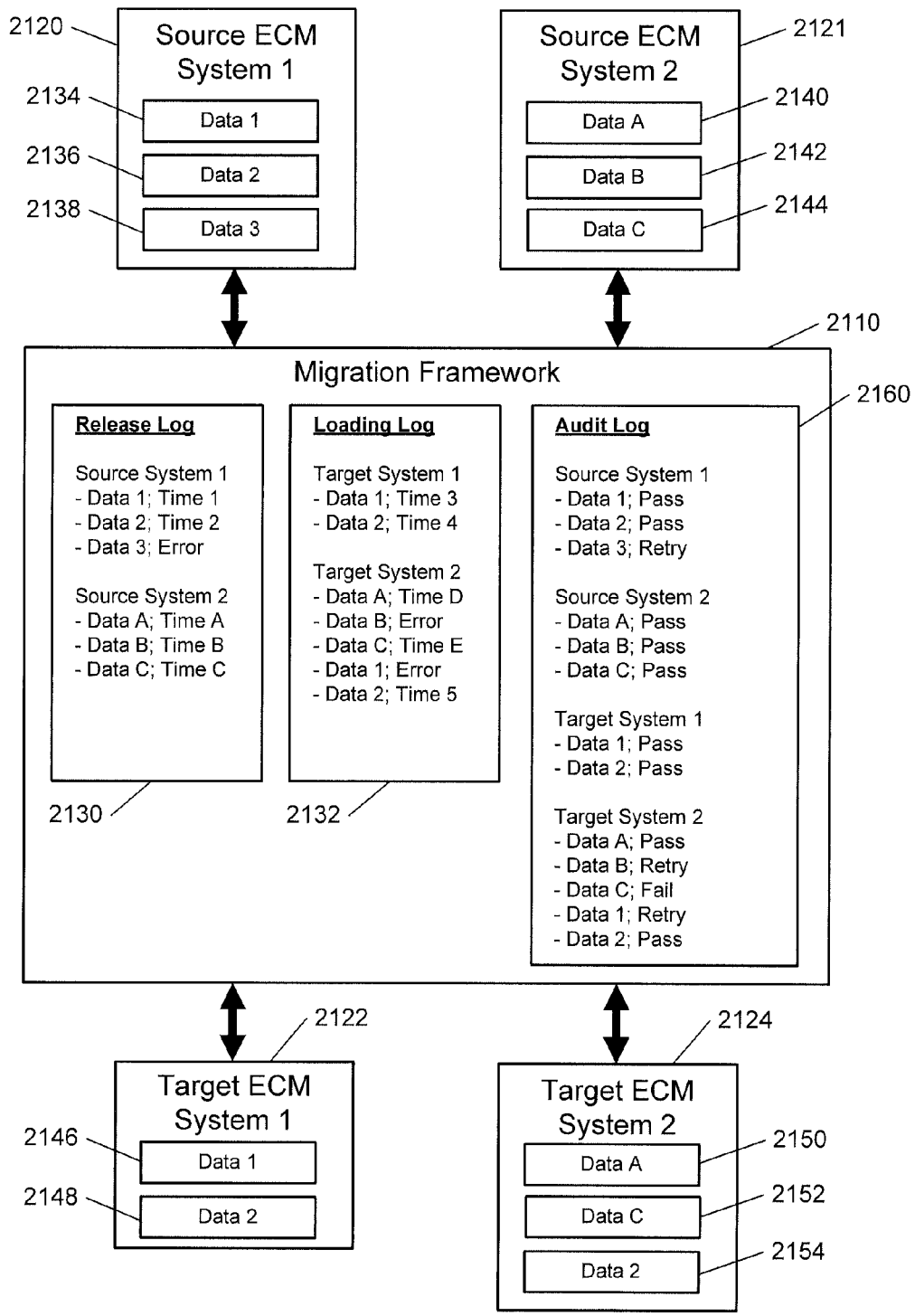

The system 200 handles migration of data from one or more source enterprise content management systems to one or more target enterprise content management systems (2010). For example and as shown in FIG. 21, a framework 2110 may be used to migrate data from a first source ECM system 2120 and/or from a second source ECM system 2121 to a first target ECM system 2122 and/or to a second target ECM system 2124.

The system 200 logs end-to-end migration operations performed during the migration (2020). For example, the system 200 may record the release of each document from a source ECM system in a release log and may record the loading of each document to a target ECM system in a loading log. For each release or loading operation, a document identifier, a date and time of the operation, and an indication of whether the operation succeeded may be stored. For instance, in the example of FIG. 21, a release log 2130 records releases performed using the framework 2110 and a loading log 2132 records loading operations performed using the framework 2110.

As shown, the release log 2130 records that "data one" 2134 and "data two" 2136 were released from the source ECM system 2120 at "time one" and "time two," respectively, and that an error occurred while attempting to release "data three" 2138. The release log 2130 also records that "data A" 2140, "data B" 2142, and "data C" 2144 were released from the source ECM system 2121 at "time A," "time B," and "time C," respectively.

The loading log 2132 records that copies of "data one" 2134 and "data two" 2136 were loaded to the target ECM system 2122 at "time three" and "time four," respectively, as illustrated by "data one" 2146 and "data two" 2148 items included in the target ECM system 2122, respectively. The loading log 2132 also records that copies of "data A" 2140 and "data C" 2144 were loaded to the target ECM system 2124 at "time D" and "time E," respectively, as illustrated by "data A" 2150 and "data C" 2152 items included in the target ECM system 2124, respectively, and that an error occurred while trying to load a copy of "data B" 2142 to the target ECM system 2124. Finally, the loading log 2132 records that a copy of "data two" 2136 was loaded to the target ECM system 2124 at "time five" (as illustrated by a "data two" item 2154 included in the target ECM system 2124) and that an error occurred while loading a copy of "data one" 2134 to the target ECM system 2124.

Returning to FIG. 20, based on the logging, the system 200 audits the one or more target enterprise content management systems to ensure proper migration (2030). For instance, in the example of FIG. 21, an audit may discover (as indicated in an audit log 2160) that "data three" 2138 was not successfully released from the source ECM system 2120, and that "data B" 2142 and "data 1" 2134 were not successfully loaded to the target ECM system 2124. The audit log 2160 also indicates that an audit of "data C" in the target ECM system 2124 has failed. In this example, although the releasing and loading of "data C" did not result in an error, the "data C" item 2152 stored in the target ECM system 2124 does not match the "data C" item 2144 stored in the source ECM system 2121.

The system 200 takes corrective action in response to a determination that at least some data was not properly migrated (2040). For instance, in the example of FIG. 21, based on the audit log 2160, a retry of the release of "data three" 2138 from the source ECM system 2120 and a retry of loading "data B" 2142 and "data 1" 2134 to the target ECM system 2124 may be performed. The system 200 also may attempt to correct the failure of "data C" properly migrating from the source ECM system 2121 to the target ECM system 2124.

The system 200 provides reporting based on the logging and auditing (2050). For instance, in the example of FIG. 21, the contents of the release log 2130, the loading log 2132, and the audit log 2160 may be presented in a printed and/or onscreen report. Statistics also may be computed based on the release log 2130, the loading log 2132, and the audit log 2160 and included in the report.

Figure 22:
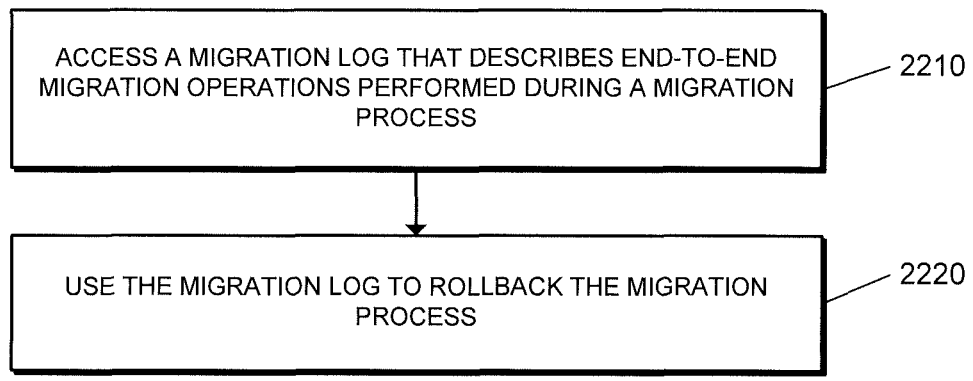

FIG. 22 illustrates a process 2200 for rolling back a migration process. The operations of the process 2200 are described generally as being performed by the system 200. The operations of the process 2200 may be performed by one of the components of the system 200 (e.g., the batch engine 216) or may be performed by a combination of the components of the system 200. In some implementations, operations of the process 2200 may be performed by one or more processors included in one or more electronic devices.

The system 200 accesses a migration log that describes end-to-end migration operations performed during a migration process (2210). For instance, in the example of FIG. 21, the release log 2130 and the loading log 2132, which describe migrations from the first source ECM system 2120 and/or from the second source ECM system 2121 to the first target ECM system 2122 and/or to the second target ECM system 2124, may be accessed.

The system 200 uses the migration log to rollback the migration process (2220). For instance, in the example of FIG. 21, the loading log 2132 may be read to identify loads which occurred to the ECM target system 2122 and/or to the target ECM system 2124. For each successful load recorded in the loading log 2132, an associated data item may be located in the target ECM system to which the data item was loaded, and a command may be issued to delete the data item from the target ECM system.

Figure 23:
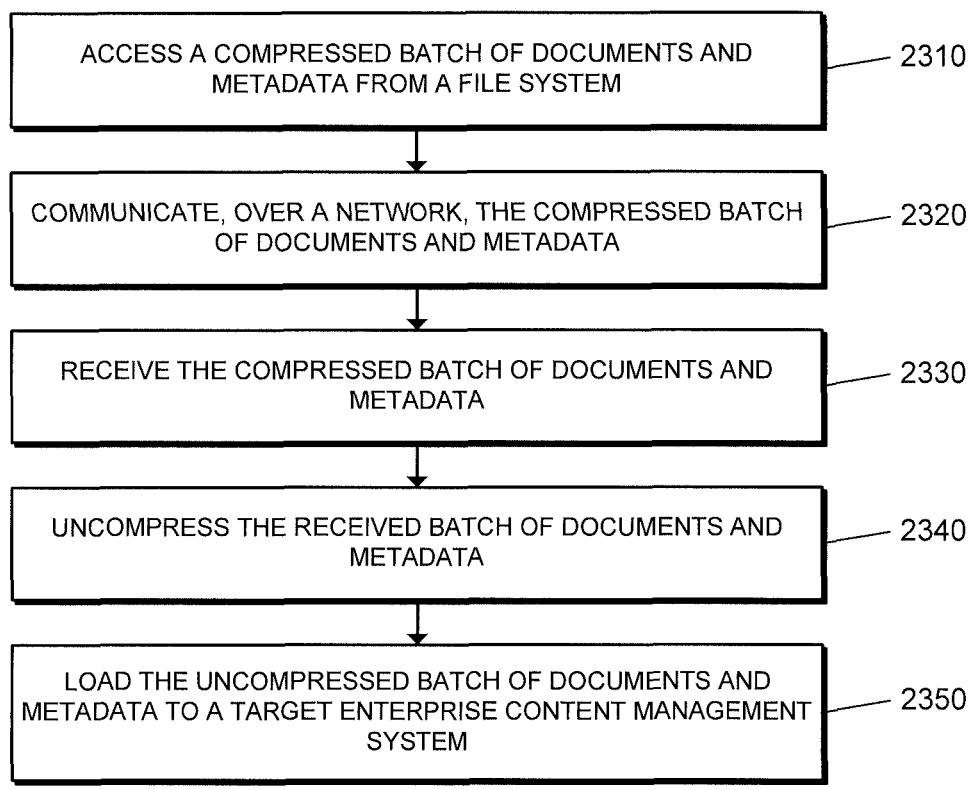

FIG. 23 illustrates a process 2300 for performing a migration process over a network. The operations of the process 2300 are described generally as being performed by the system 200. The operations of the process 2300 may be performed by one of the components of the system 200 (e.g., the batch engine 216) or may be performed by a combination of the components of the system 200. In some implementations, operations of the process 2300 may be performed by one or more processors included in one or more electronic devices.

Figure 24:
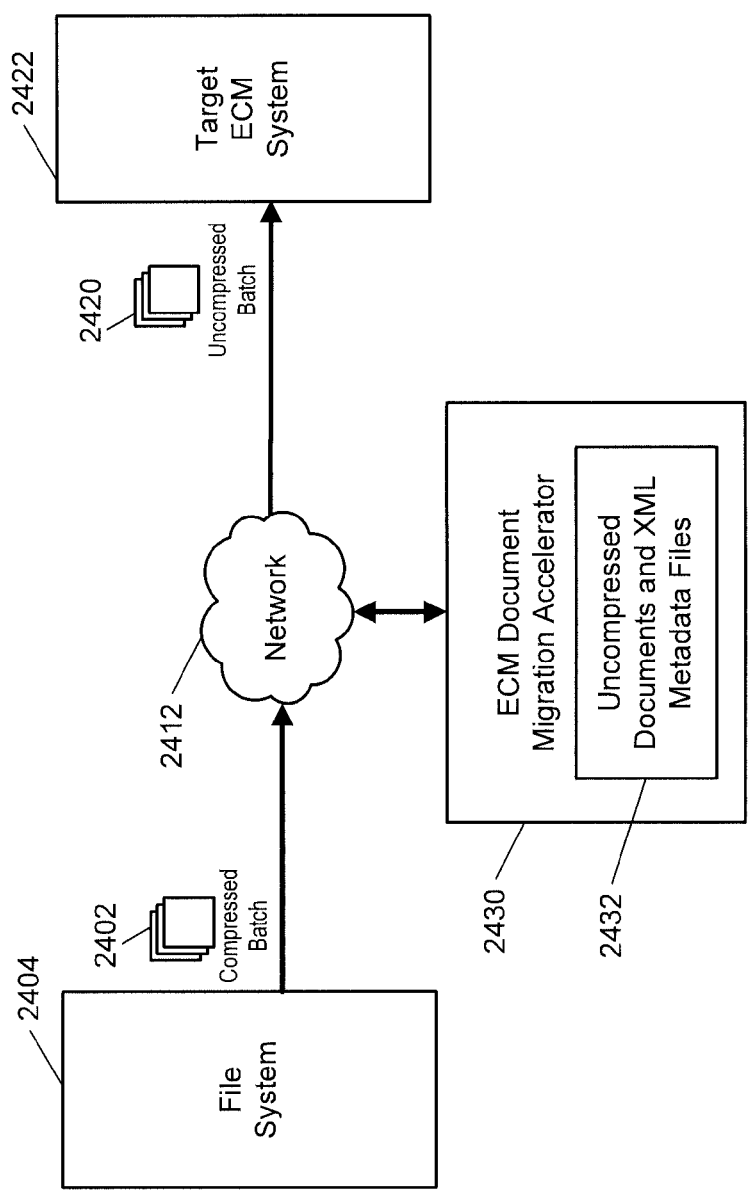

The system 200 accesses a compressed batch of documents and metadata from a file system (2310). For example and as shown in FIG. 24, a compressed batch of documents and metadata 2402 may be released from a file system 2404 using a release component and possibly other migration components included in an ECM document migration accelerator framework 2430. The compressed batch of documents and metadata may include compressed zip files or folders.

The system 200 communicates, over a network, the compressed batch of documents and metadata (2320). For instance, in the example of FIG. 24, the file system 2404 may communicate the compressed batch of documents and metadata 2402 across a network 2412.

The system 200 receives the compressed batch of documents and metadata (2330). For instance, in the example of FIG. 24, an ECM document migration accelerator framework 2430 may receive the compressed batch of documents and metadata 2402 over the network 2412. The ECM document migration accelerator framework 2430 may receive the compressed batch of documents and metadata 2402 through a firewall protecting the file system 2404 or may sit behind a firewall protecting the file system 2404 such that the compressed batch of documents and metadata 2402 does not have to pass through the firewall to reach the ECM document migration accelerator framework 2430.

The system 200 uncompresses the received batch of documents and metadata (2340). For instance, in the example of FIG. 24, the ECM document migration accelerator framework 2430 may uncompress the compressed batch of documents and metadata 2402 and store uncompressed documents and metadata in a staging storage area 2432.

The system 200 loads the uncompressed batch of documents and metadata to a target enterprise content management system (2350). For instance, in the example of FIG. 24, a loading component included in the ECM document migration accelerator framework 2430 assembles uncompressed documents and metadata from the staging storage area 2432 into an uncompressed batch of documents and metadata 2420. After assembling the uncompressed batch of documents and metadata 2420, the loading component included in the ECM document migration accelerator framework 2430 may load the uncompressed batch of documents and metadata 2420 to a target ECM system 2422. For instance, the loading component included in the ECM document migration accelerator framework 2430 may send the uncompressed batch of documents and metadata 2420 to the target ECM system 2422 over the network 2412. The ECM document migration accelerator framework 2430 may push the uncompressed batch of documents and metadata 2420 through a firewall protecting the target ECM system 2422. In some examples, the ECM document migration accelerator framework 2430 may sit behind a firewall protecting the target ECM system 2422 such that the uncompressed batch of documents and metadata 2420 does not have to pass through the firewall to reach the target ECM system 2422. In these examples, the ECM document migration accelerator framework 2430 may be able to pull documents into the firewall protecting the target ECM system 2422, which may allow migration even when strict security protocols prevent pushing of documents through the firewall.

Figure 25:
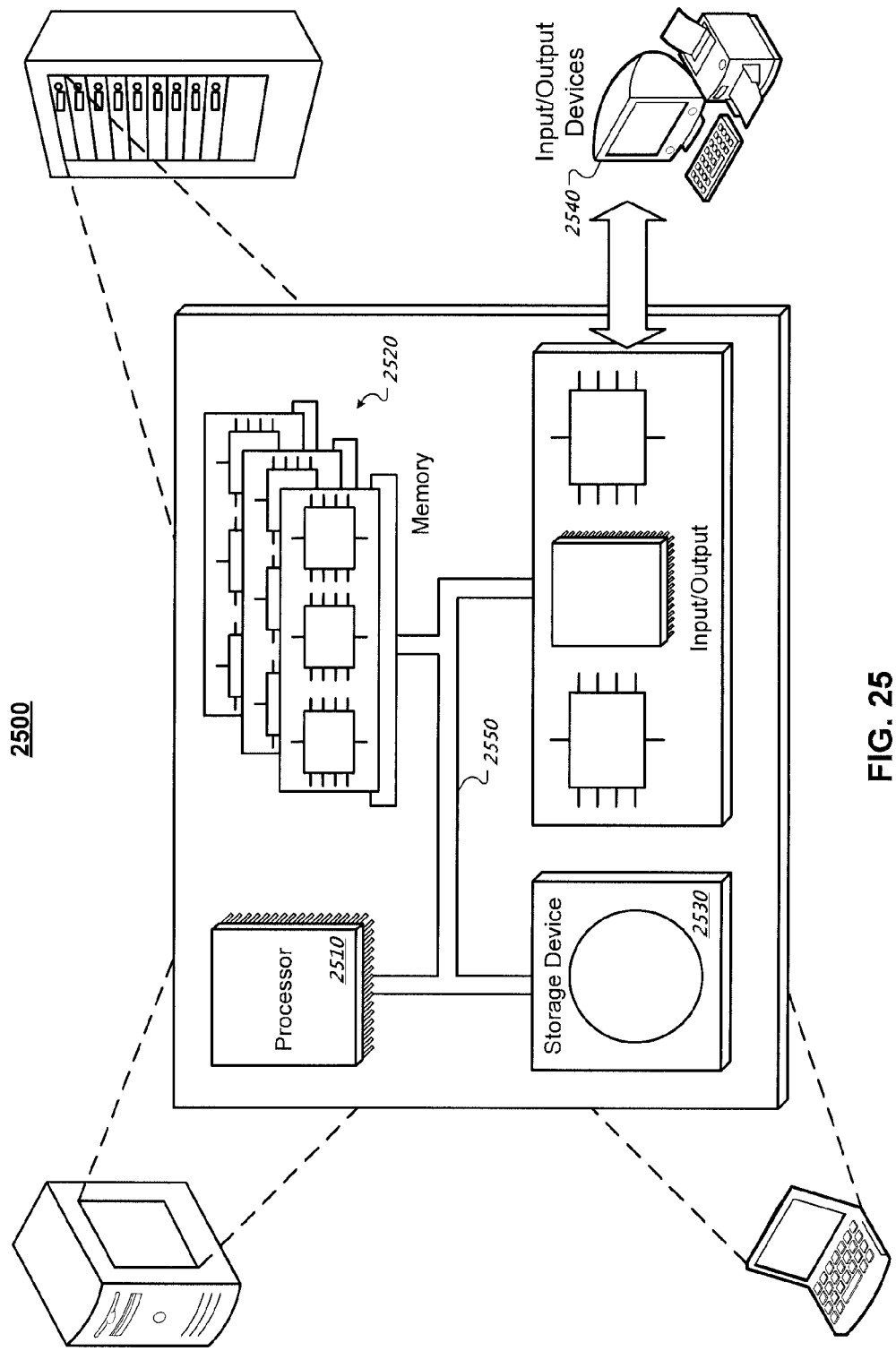

FIG. 25 is a schematic diagram of an example of a generic computer system 2500. The system 2500 can be used for the operations described in association with the processes 300, 500, 700, 800, 900, 1000, 2000, 2200, and 2300 according to one implementation. For example, the system 2500 may be included in the staging server 110.

The system 2500 includes a processor 2510, a memory 2520, a storage device 2530, and an input/output device 2540. Each of the components 2510, 2520, 2530, and 2540 are interconnected using a system bus 2550. The processor 2510 is capable of processing instructions for execution within the system 2500. In one implementation, the processor 2510 is a single-threaded processor. In another implementation, the processor 2510 is a multi-threaded processor. The processor 2510 is capable of processing instructions stored in the memory 2520 or on the storage device 2530 to display graphical information for a user interface on the input/output device 2540.

The memory 2520 stores information within the system 2500. In one implementation, the memory 2520 is a computer-readable medium. In one implementation, the memory 2520 is a volatile memory unit. In another implementation, the memory 2520 is a non-volatile memory unit.

The storage device 2530 is capable of providing mass storage for the system 2500. In one implementation, the storage device 2530 is a computer-readable medium. In various different implementations, the storage device 2530 may be a floppy disk device, a hard disk device, an optical disk device, or a tape device.

The input/output device 2540 provides input/output operations for the system 2500. In one implementation, the input/output device 2540 includes a keyboard and/or pointing device. In another implementation, the input/output device 2540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system for migrating documents from a source enterprise content management system to a target enterprise content management system, the system comprising:
   a release component configured to establish a source connection with a source enterprise content management system using a source connector that interfaces with the source enterprise content management system, and release, from the source enterprise content management system over the established source connection, documents and metadata that correspond to the released documents;
   an electronic data storage unit configured to temporarily store the released documents and the released documents metadata;
   a loading component configured to access, from the electronic data storage unit, the released documents and the released documents metadata, map source metadata attributes from the released documents to target metadata attributes, establish a target connection with a target enterprise content management system using a target connector that interfaces with the target enterprise content management system, and load, over the established target connection to the target enterprise content management system, the released documents and the mapped metadata, the source metadata attributes corresponding to attributes of the source enterprise content management system and the target metadata attributes corresponding to attributes of the target enterprise content management system; and a batch engine configured to control the release component to release, from the source enterprise content management system, batches of documents and metadata, control the loading component to load, to the target enterprise content management system, batches of documents and metadata that have been released from the source enterprise content management system, and store migration records that describe migration operations from release from the source enterprise content management system through loading to the target enterprise content management system, wherein the batch engine is configured to define a release schedule that uses multiple release threads that operate concurrently, define a loading schedule that uses multiple loading threads that operate concurrently, control, based on the defined release schedule, release of a batch of documents and metadata using the multiple release threads that operate concurrently, and control, based on the defined loading schedule, loading of the batch of documents and metadata using the multiple loading threads that operate concurrently, where at least one of the release threads operates concurrently with at least one of the loading threads such that a first subset of the batch of documents and metadata is being loaded to the target enterprise content management system while a second subset of the batch of documents and metadata is being released from the source enterprise content management system.

2. The system of claim 1, further comprising a user interface component configured to provide a standard user interface for a migration process that offers the same user experience regardless of which of multiple, different target enterprise content management systems is involved in the migration process and regardless of which of multiple, different source enterprise content management systems is involved in the migration process.

3. The system of claim 2, wherein the user interface component is configured to display a standard configuration user interface for defining configuration of the migration process.

4. The system of claim 2, wherein the user interface component is configured to display a standard monitoring user interface for monitoring progress of the migration process.

5. The system of claim 2, wherein the user interface component is configured to display a standard reporting user interface for reporting results of the migration process.

6. The system of claim 1, wherein the system is configured to add a new source enterprise content management system for migration release, define a new source connector to interface with the new source enterprise content management system, and perform migration operations for the new source enterprise content management system using the new source connector and previously defined migration components.

7. The system of claim 1, wherein the system is configured to add a new target enterprise content management system for migration loading, define a new target connector to interface with the new target enterprise content management system, and perform migration operations for the new target enterprise content management system using the new target connector and previously defined migration components.

8. The system of claim 1, wherein the system is configured to handle migration of data from one or more source enterprise content management systems to one or more target enterprise content management systems and log end-to-end migration operations performed during the migration.

9. The system of claim 8, wherein the system is configured to, based on the logged end-to-end migration operations, audit the one or more target enterprise content management systems to ensure proper migration.

10. The system of claim 9, wherein the system is configured to take corrective action in response to the audit revealing that at least some data was not properly migrated.

11. The system of claim 9, wherein the system is configured to provide reporting based on results of the logging and auditing.

12. The system of claim 1, wherein the system is configured to access a migration log that describes end-to-end migration operations performed during a migration process and use the migration log to rollback the migration process.

13. The system of claim 1, wherein the release component is configured to access a compressed batch of documents and metadata from a file system.

14. The system of claim 13, wherein the loading component is configured to receive the compressed batch of documents and metadata, uncompress the received batch of documents and metadata, and load the uncompressed batch of documents and metadata to the target enterprise content management system.

15. The system of claim 14, wherein the loading component sits behind a firewall of a computer network operated by a company that uses the target enterprise content management system and the loading component is configured to pull the compressed batch of documents and metadata through the firewall.

16. The system of claim 1, wherein the batch engine is configured to set a status of each of the batches from among status options including new, running, complete, stopped, and pending.

17. The system of claim 1, wherein the batch engine is configured to stop a subset of less than all of the multiple release threads and the multiple loading threads.

18. The system of claim 1, wherein the batch engine is configured to maintain a list of running release threads, determine to start a new batch of documents and metadata, determine whether a number of running release threads meets a maximum release thread count, and execute the release component to begin release of the new batch of documents and metadata on a new thread based on a determination that the number of running release threads does not meet the maximum release thread count.

19. A computer-implemented method of migrating documents from a source enterprise content management system to a target enterprise content management system, the method comprising:

establishing a source connection with a source enterprise content management system using a source connector that interfaces with the source enterprise content management system;

releasing, from the source enterprise content management system over the established source connection, documents and metadata that correspond to the released documents;

temporarily storing, in an electronic data storage unit, the released documents and the released metadata;

accessing, from the electronic data storage unit, the released documents and the released metadata;

mapping source metadata attributes from the released metadata to target metadata attributes, the source metadata attributes corresponding to attributes of the source enterprise content management system and the target metadata attributes corresponding to attributes of a target enterprise content management system;

establishing a target connection with a target enterprise content management system using a target connector that interfaces with the target enterprise content management system;

loading, over the established target connection to the target enterprise content management system, the released documents and the mapped metadata; and using a batch engine to control release, from the source enterprise content management system, of batches of documents and metadata, control loading, to the target enterprise content management system, of batches of documents and metadata that have been released from the source enterprise content management system, and store migration records that describe migration operations from release from the source enterprise content management system through loading to the target enterprise content management system, wherein using the batch engine comprises using the batch engine to define a release schedule that uses multiple release threads that operate concurrently, define a loading schedule that uses multiple loading threads that operate concurrently, control, based on the defined release schedule, release of a batch of documents and metadata using the multiple release threads that operate concurrently, and control, based on the defined loading schedule, loading of the batch of documents and metadata using the multiple loading threads that operate concurrently, where at least one of the release threads operates concurrently with at least one of the loading threads such that a first subset of the batch of documents and metadata is being loaded to the target enterprise content management system while a second subset of the batch of documents and metadata is being released from the source enterprise content management system.

20. At least one non-transitory computer-readable storage medium encoded with executable instructions that, when executed by at least one processor, cause the at least one processor to perform operations comprising:

establishing a source connection with a source enterprise content management system using a source connector that interfaces with the source enterprise content management system;

releasing, from the source enterprise content management system over the established source connection, documents and metadata that correspond to the released documents;

temporarily storing, in an electronic data storage unit, the released documents and the released metadata;

accessing, from the electronic data storage unit, the released documents and the released metadata;

mapping source metadata attributes from the released metadata to target metadata attributes, the source metadata attributes corresponding to attributes of the source enterprise content management system and the target metadata attributes corresponding to attributes of a target enterprise content management system;

establishing a target connection with a target enterprise content management system using a target connector that interfaces with the target enterprise content management system;

loading, over the established target connection to the target enterprise content management system, the released documents and the mapped metadata; and using a batch engine to control release, from the source enterprise content management system, of batches of documents and metadata, control loading, to the target enterprise content management system, of batches of documents and metadata that have been released from the source enterprise content management system, and store migration records that describe migration operations from release from the source enterprise content management system through loading to the target enterprise content management system, wherein using the batch engine comprises using the batch engine to define a release schedule that uses multiple release threads that operate concurrently, define a loading schedule that uses multiple loading threads that operate concurrently, control, based on the defined release schedule, release of a batch of documents and metadata using the multiple release threads that operate concurrently, and control, based on the defined loading schedule, loading of the batch of documents and metadata using the multiple loading threads that operate concurrently, where at least one of the release threads operates concurrently with at least one of the loading threads such that a first subset of the batch of documents and metadata is being loaded to the target enterprise content management system while a second subset of the batch of documents and metadata is being released from the source enterprise content management system.

* * * * *